United States Patent
Rofougaran

(10) Patent No.: US 8,325,153 B2
(45) Date of Patent: Dec. 4, 2012

(54) ANTENNA INCLUDING ELEMENTS OF AN INDUCTIVE TOUCH SCREEN AND COMMUNICATION DEVICE FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/269,960

(22) Filed: Oct. 10, 2011

(65) Prior Publication Data
US 2012/0026133 A1 Feb. 2, 2012

Related U.S. Application Data

(63) Continuation of application No. 12/468,258, filed on May 19, 2009, now Pat. No. 8,060,029.

(51) Int. Cl.
*G06F 3/045* (2006.01)

(52) U.S. Cl. .......................................................... 345/174
(58) Field of Classification Search ........................ None
See application file for complete search history.

(56) References Cited

U.S. PATENT DOCUMENTS

| 6,819,287 | B2 * | 11/2004 | Sullivan et al. | ........ 343/700 MS |
| 8,000,737 | B2 * | 8/2011 | Caimi et al. | ................ 455/550.1 |
| 2010/0097322 | A1 * | 4/2010 | Hu et al. | ........................ 345/173 |

FOREIGN PATENT DOCUMENTS

CN 101187845 A 11/2006
* cited by examiner

*Primary Examiner* — Lincoln Donovan
*Assistant Examiner* — Sibin Chen
(74) *Attorney, Agent, or Firm* — Garlick & Markison; Bruce E. Stuckman

(57) ABSTRACT

An antenna includes an antenna section and a ground plane. The ground plane includes a plurality of inductors that provide a high impedance at the operating frequency of the antenna. The plurality of inductors are implemented via a plurality of inductive elements of an inductive touch screen.

14 Claims, 27 Drawing Sheets

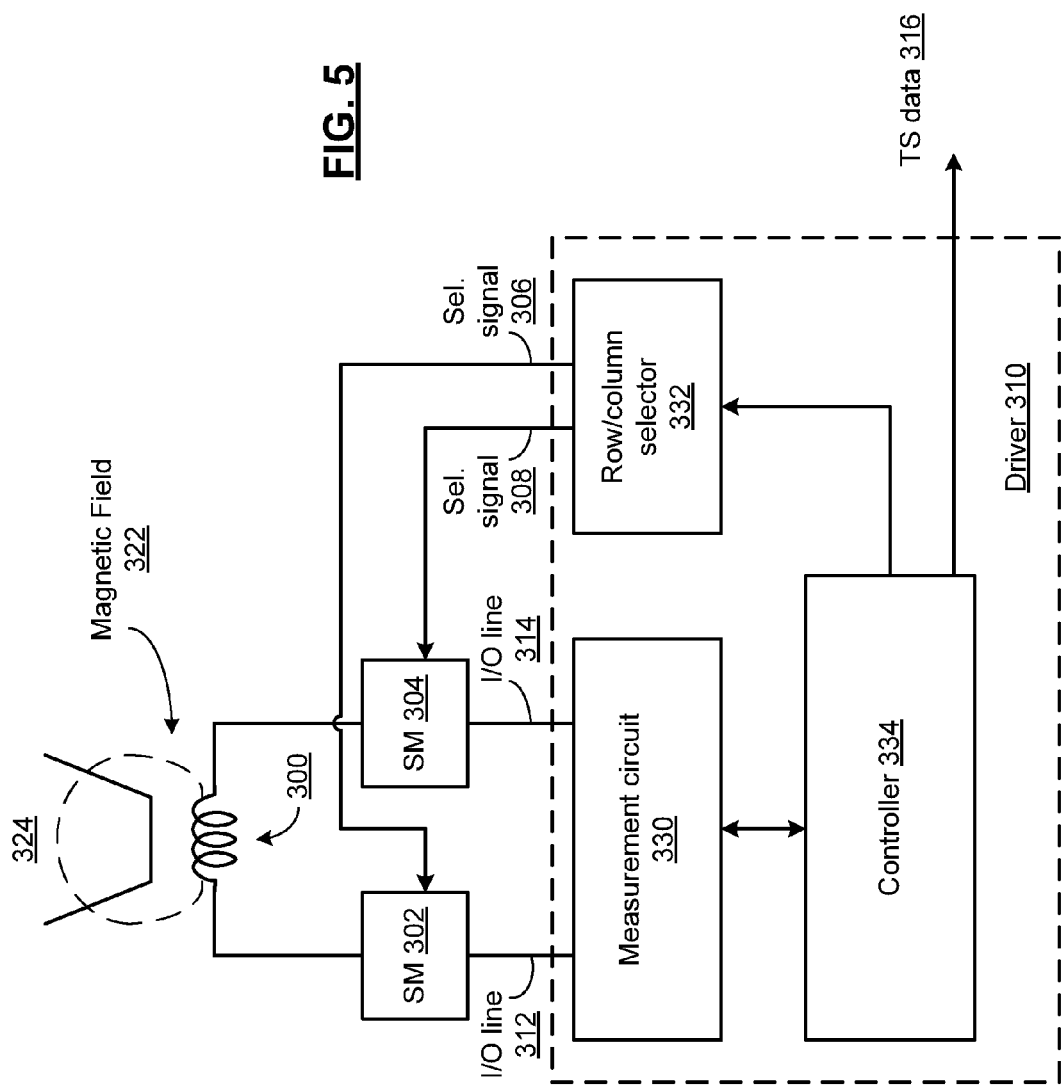

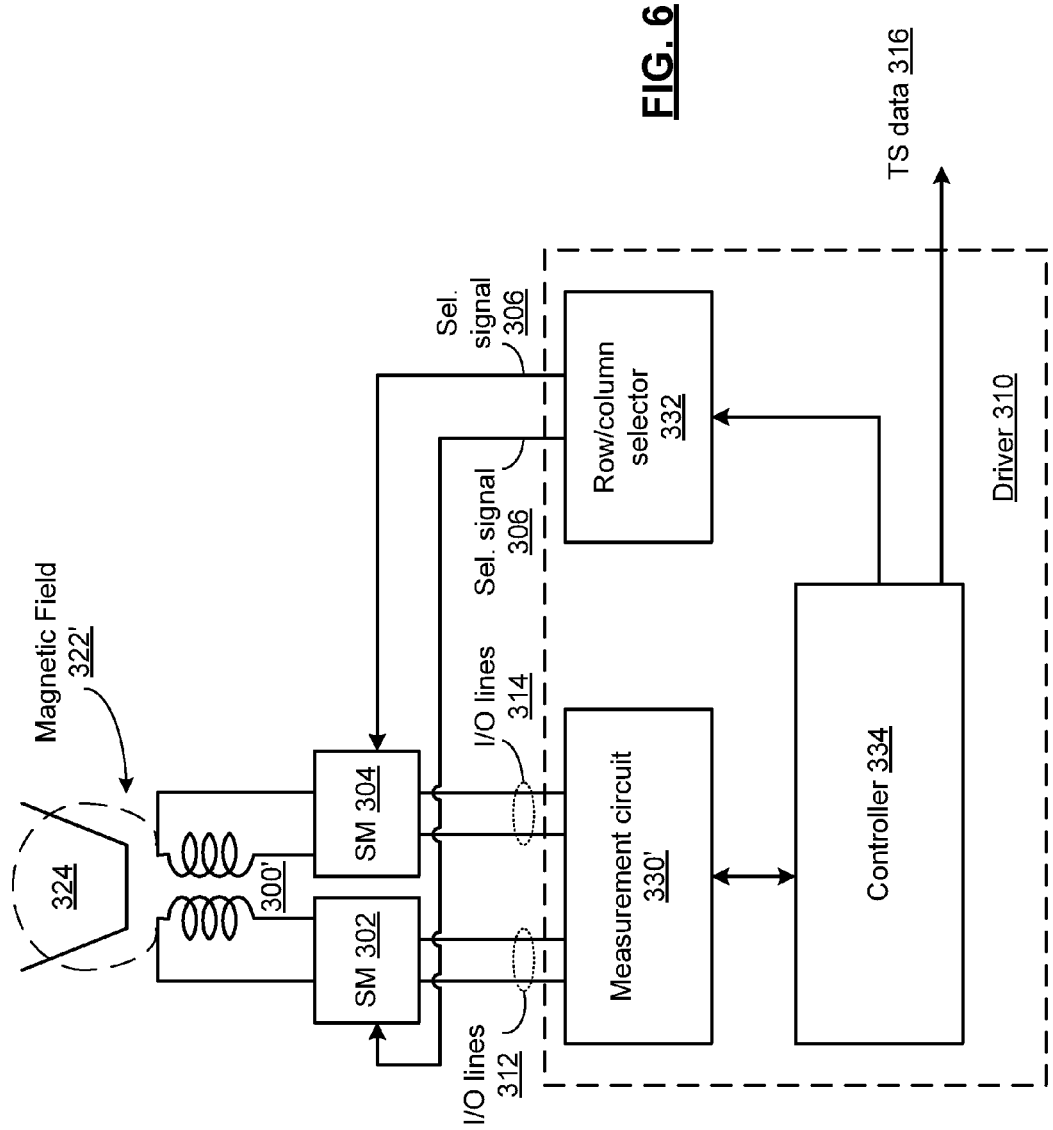

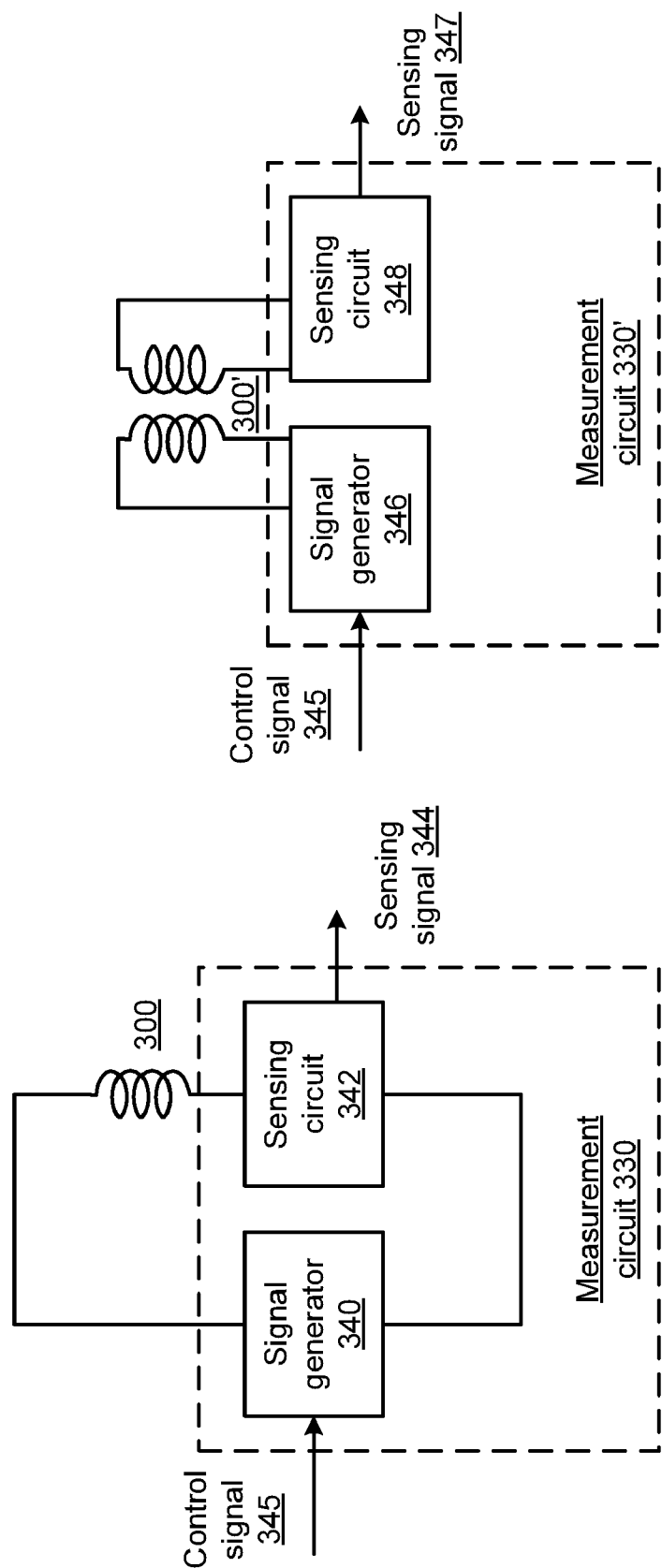

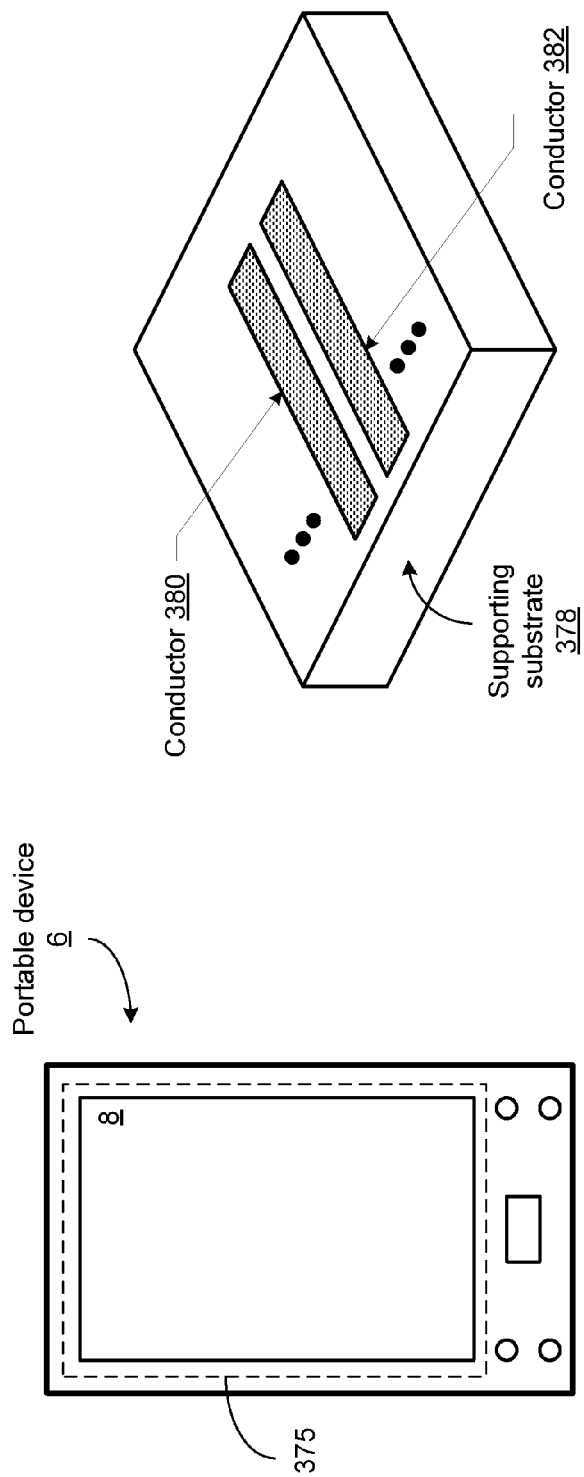
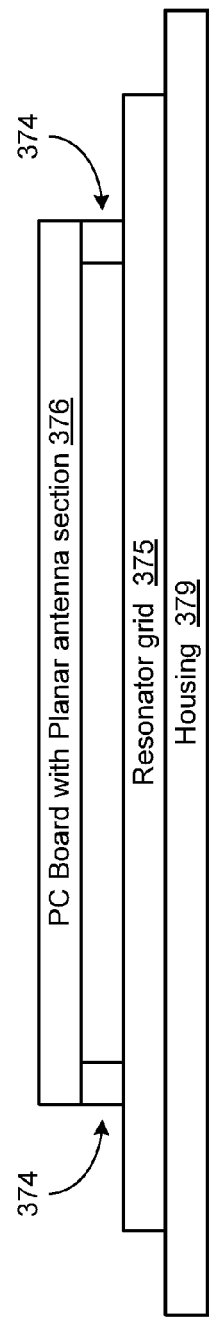

ANTENNA INCLUDING ELEMENTS OF AN INDUCTIVE TOUCH SCREEN AND COMMUNICATION DEVICE FOR USE THEREWITH

CROSS REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 12/468,258, entitled "ANTENNA WITH RESONATOR GRID AND METHODS FOR USE THEREWITH,", filed May 19, 2011, pending.

The present application is related to the following U.S. patent application:
INDUCTIVE TOUCH SCREEN WITH INTEGRATED ANTENNA FOR USE IN A COMMUNICATION DEVICE AND METHODS FOR USE THEREWITH having Ser. No. 12/426,946, filed on Apr. 20, 2009, the contents of which are incorporated herein by reference thereto.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

2. Technical Field of the Invention

This invention relates generally to wireless communication and more particularly to transceivers used to support wireless communications in unlicensed spectra.

3. Description of Related Art

Display screens capable of touch input or touch screens, are used in a wide variety of electronic equipment including portable, or handheld, devices. Such handheld devices include personal digital assistants (PDA), CD players, MP3 players, DVD players, AM/FM radios. Each of these handheld devices includes one or more integrated circuits to provide the functionality of the device. Examples of touch screens include resistive touch screens and capacitive touch screens that include a display layer and sensing layer that is coupled to detect when a user has touched the screen and to resolve the location of the touch. By coordinating the location of the touch with the information displayed on the display layer at that location, a touch sensitive graphical user interface can be implemented.

Other examples of handheld devices include communication devices that operate in a communication system. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multipoint distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

The disadvantages of conventional approaches will be evident to one skilled in the art when presented the disclosure that follows.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 5 is a schematic block diagram of an embodiment of a driver 310 in accordance with the present invention;

FIG. 6 is a schematic block diagram of an embodiment of a driver 310' in accordance with the present invention;

FIG. 7 is a schematic block diagram of measurement circuit 330 in accordance with an embodiment of the present invention;

FIG. 8 is a schematic block diagram of measurement circuit 330' in accordance with an embodiment of the present invention;

FIG. 27 is a pictorial diagram of a portable device having an inductive touch screen in accordance with the present invention;

FIG. 28 is a side view of an embodiment of antenna components in accordance with the present invention;

FIG. 29 is a top view of an embodiment of a portion of a resonator grid in accordance with the present invention;

DETAILED DESCRIPTION OF THE INVENTION

Figure 1:
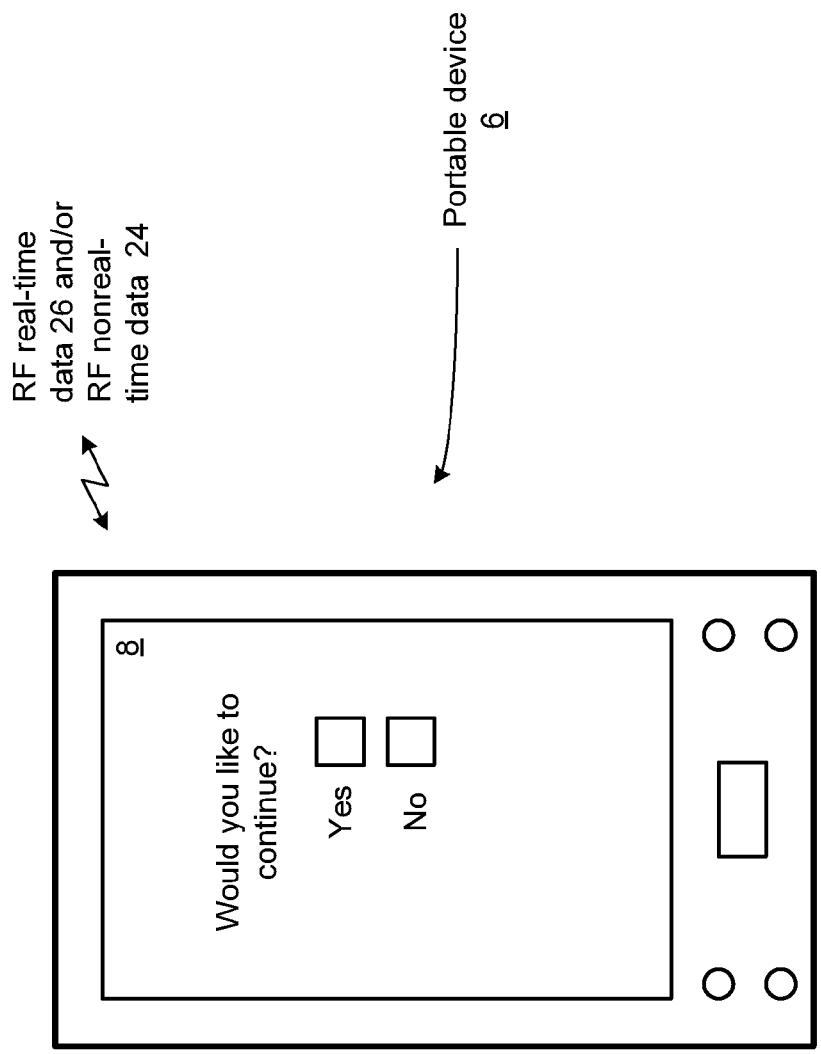
FIG. 1 is a pictorial diagram of a portable device having an inductive touch screen in accordance with the present invention.

FIG. 1 is a pictorial diagram of a portable device having an inductive touch screen in accordance with the present invention. In particular, a portable device 6 is shown, such as a personal digital assistant (PDA), MP3 player, video player, electronic book or other media player, tablet personal computer (PC) or other computer, smartphone or other wireless telephony device, remote controller, universal remote controller or other control device, a game controller or other gaming device, etc. In particular, portable device 6 optionally includes one or more transceivers, such as a wireless telephony transceiver, Bluetooth transceiver, wireless local area network transceiver, RF identification (RFID) transceiver, or other transceiver for wireless communication, either directly or indirectly, with one or more remote stations.

Portable device 6 includes an inductive touch screen 8 that is used as part of a user interface. Inductive touch screen 8 includes a display screen, such as a liquid crystal display, plasma display or other display for displaying text and graphics such as images, icons, video and other media. In operation, inductive touch screen 8 can interact with a user by displaying information and responding to either the touch or proximity of a touch object such as a user's finger, stylus or other object to receive user input. In the example shown on the display screen of inductive touch screen 8, the user is prompted to select either "yes" or "no" by "touching" the corresponding box with a touch object.

Inductive touch screen 8 includes one or more functions and features of the present invention that will be discussed in conjunction with FIGS. 2-34 that follow.

Figure 2:
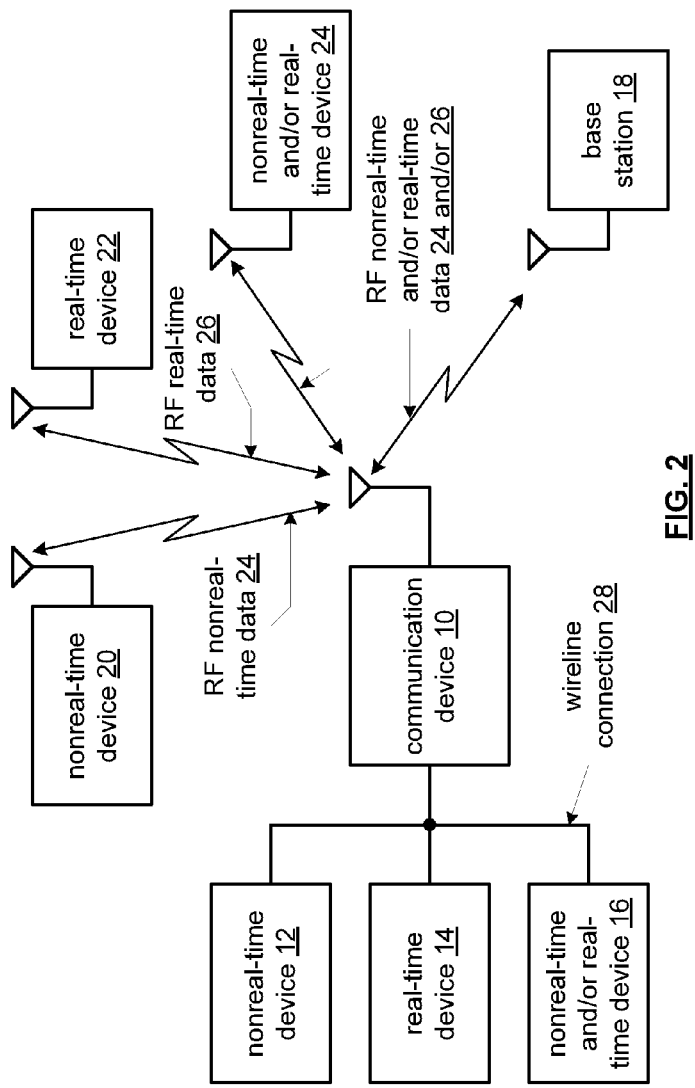
FIG. 2 is a schematic block diagram of an embodiment of a wireless communication system in accordance with the present invention.

FIG. 2 is a schematic block diagram of an embodiment of a communication system in accordance with the present invention. In particular a communication system is shown that includes a communication device 10, such as portable device 6, that communicates real-time data 24 and/or non-real-time data 26 wirelessly with one or more other devices such as base station 18, non-real-time device 20, real-time device 22, and non-real-time and/or real-time device 25. In addition, communication device 10 can also optionally communicate over a wireline connection with non-real-time device 12, real-time device 14, non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection can communicate in accordance with a wireless network protocol such as wireless high definition (WiHD), next generation mobile systems (NGMS), IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 10.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication path. In an embodiment of the present invention, the real-time and non-real-time devices 12, 14 16, 18, 20, 22 and 25 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 has an inductive touch screen 8 and/or a antenna structure that includes one or more functions and features of the present invention that will be discussed in conjunction with FIGS. 3-34 that follow.

Figure 3:
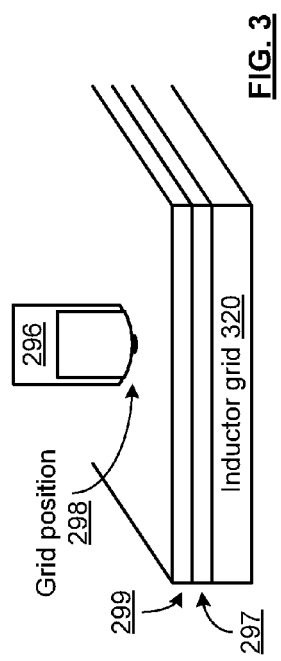
FIG. 3 is a pictorial/schematic diagram of an embodiment of inductive touch screen components in accordance with the present invention.

FIG. 3 is a pictorial/schematic diagram of an embodiment of inductive touch screen components in accordance with the present invention. In particular, a portion of an inductive touch screen, such as inductive touch screen 8, is shown that includes a display layer 299 coupled to an inductor grid 320 via an optional intermediate layer 297. The diagram is not drawn to scale, and in particular, the thickness of the display layer 299, optional intermediate layer 297 and inductor grid have been expanded. Display layer 299 can include a LCD layer, plasma layer or other display layer. Inductor grid 320 includes an array or other grid of inductive elements. In operation, the grid position 298 of either the touch by, or proximity of, a touch object such as finger 296 is determined using inductor grid 320. In particular, one or more inductive elements of inductor grid 320 are used to determine grid position 298 based on a change in the magnetic field in these inductive elements caused by the proximity or touch by touch object 296.

In an embodiment of the present invention, the display layer 299 includes a metallic sublayer, a ferrite impregnated sublayer or other magnetic structure. Display layer 299 is elastic and responds to the touch of touch object 296 by deflecting toward the inductor grid 320 in the region around grid position 298. The change in the magnetic field caused by deflection of the magnetic structure is detected by the inductive element or elements in the region of the grid position 298 and is used by the inductive touch screen to detect touch by touch object 296 as well as the grid position 298. In this case, optional intermediate layer 297 can include an air gap or other gap, a compressible layer, an electrical insulator that is magnetically conductive or can be omitted from the design.

In another embodiment, the touch object 296 can be replaced by a stylus with a ferromagnetic tip or other magnetic element that causes a detectable change in the magnetic field of one or more inductive elements in the region of the grid position 298. In a further embodiment, the touch object 296, such as the finger shown, causes a detectable change in the magnetic field of one or more inductive elements in the region of the grid position 298. In either case, optional intermediate layer 297 can include an air gap or other gap, an electrical insulator that is magnetically conductive, another magnetically conductive material or can be omitted from the design.

Figure 4:
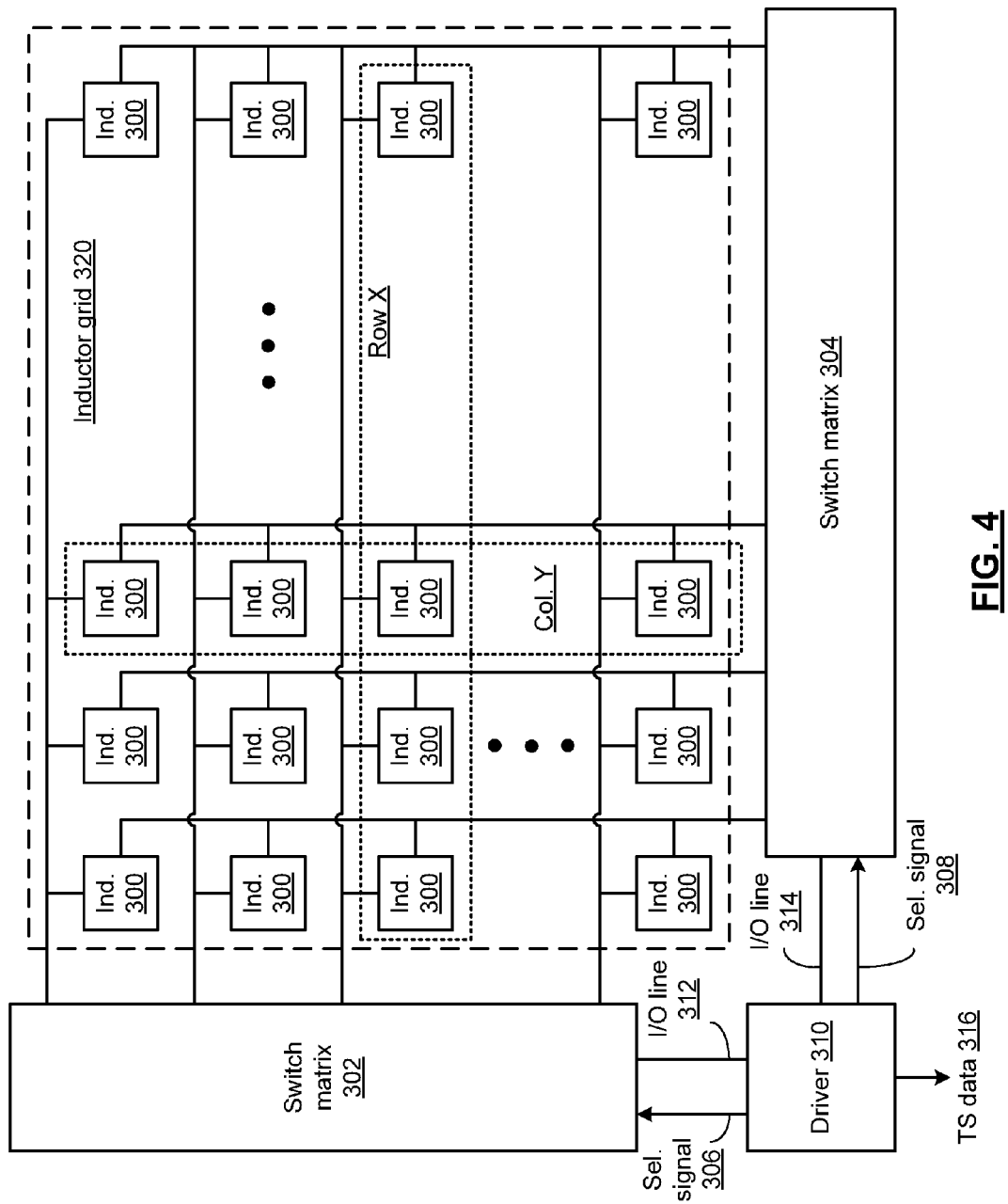
FIG. 4 is a schematic block diagram of an embodiment of inductive touch screen components in accordance with the present invention.

FIG. 4 is a schematic block diagram of an embodiment of inductive touch screen components in accordance with the present invention. In particular, portions of a touch screen, such as touch screen 8, are shown including inductor grid 320 of inductive elements 300, switch matrices 302 and 304 and driver 310. As shown in conjunction with FIG. 3 inductor grid 320 is coupled to a display layer, such as display layer 299 to provide the screen display functionality of the touch screen and optionally to provide a magnetic layer whose displacement is used in conjunction with inductor grid 320 to create a detectable magnetic disturbance in response to the touch of a touch object such as a finger or stylus. In an embodiment of the present invention, the inductive elements 300 are made up of individual coils that are arranged on a single layer of a substrate, film or other supporting material.

In operation, the switch matrices 302 and 304 select individual inductive elements 300 of the inductor grid 329 in response to the selection signals 306 and 308. In the particular configuration shown, selection signal 306 commands switch matrix 302 to select a row of inductor grid 320. Selection signal 308 commands switch matrix 304 to select a column of inductor grid 320. A particular individual inductive element 300 in row X and column Y of inductor grid 320 can be coupled to driver 310 by the selection signals 306 and 308 that indicate this particular row/column combination.

Driver 310 drives the selected inductive element to detect whether or not there is a touch object in proximity to the selected inductive element. By scanning the inductive elements 300 of inductor grid 320, driver 310 generates data that indicates which of the inductive elements correspond to touches and their corresponding grid positions and generates touch screen data 316 in response thereto. For instance, driver 310 for an N×M inductor grid 320, driver 310 can scan each of the NM inductive elements in a single scan and then repeat the scan at periodic intervals.

It should be noted that, unlike a resistive touch screens and capacitive touch screens, the inductive touch screen that includes inductive grid 320 can detect the presence and grid position of any number simultaneous or contemporaneous touches. For instance, in a touch screen application that implements a virtual keyboard, the touch screen of FIG. 4 can detect that a user is touching three different keys, such as the "Ctrl", "Alt" and "Del" keys of the keyboard. In another example, the touch screen of FIG. 4 can detect that the user is touching the "shift" key while also touching the a letter key such as b, indicating the user wishes to type a "B" rather than a "b". In a further example involving a virtual piano keyboard, the touch screen of FIG. 4 can detect that the user is touching four piano keys corresponding to a single octave major chord. These are merely three of the many user interface applications where the simultaneous or contemporaneous touching of multiple touch points on a touch screen can be useful.

In addition, the touch screen that includes inductive grid 320 can generate touch screen data 316 that indicates touch motion, patterns and other more complex information. In particular, the scanning rate of grid 320 by driver 310 can be selected to support applications where a user slides a touch object across the touch screen. The motion of the touch object can be detected as a sequence of grid positions and represented by a corresponding sequence of touch screen data 316 that indicate a direction and/or velocity of travel of the touch object within the grid, and/or a pattern that can be used for more complex user interface applications. Such a touch screen can be used for handwriting recognition, gaming applications in addition to other applications of the device that contains such a touch screen FIG. 5 is a schematic block diagram of an embodiment of a driver 310 in accordance with the present invention. In particular, a driver 310 is shown that includes a measurement circuit 330, row/column selector 332 and controller 334 for driving a inductive element 300 implemented by a single inductor.

In operation, the switch matrices 302 and 304 include a row matrix and a column matrix that are controlled by selection signals 306 and 308 that include a row selection signal and a column selection signal. Driver 310 includes a row/column selector 332 that generates the row selection signal (e.g. selection signal 306) and the column selection signal (e.g. selection signal 308) to sequentially scan the plurality of inductive elements 300 as discussed in conjunction with FIG. 4. In this embodiment, the driver 310 detects the touch object 324 in proximity to a selected inductive element 300 based on a measured self inductance of the single inductor. Measurement circuit drives the selected inductive element 300 via input/output lines 312 and 314 with a signal that generates a magnetic field 322 in response. Interruptions to the magnetic field 322 caused by the proximity of the touch object 324 reflect as changes to the self inductance of the single inductor. The touch object 324 can interrupt the magnetic field 322 by deflecting a magnetic layer in proximity to the inductive element 300 or directly based on the magnetic content of the touch object itself. Measurement circuit 330, in turn, detects the proximity of the touch object 324 based on the change in self inductance.

Controller 334 generates control signals that command row/column selector to generate selection signals 306 and 308 to scan the inductive elements 300 of inductor grid 300. Controller 334 also generates control signals that command the measurement circuit 330 to drive an inductive element that has been selected and responds to sensing signals from the measurement circuit 330 to detect changes in the self inductance of the single inductor. In an embodiment of the present invention, the driver 310 via controller 344 executes a calibration procedure to detect an initial self inductance for each of the inductive elements 300 of inductor grid 320. During subsequent touch sensing, the controller 334 of driver 310 generates touch screen data 316 based on a comparison of the measured self inductance and the initial self inductance. In particular, changes in the self inductance that are beyond a detection threshold can indicate the detection of a touch object in proximity to a selected inductive element 300. Controller 334 generates touch screen data 316 to indicate the detection of a touch object in proximity to a selected inductive element 300 along with the grid position corresponding to the particular inductive element 300 that was selected.

Controller 334 can include a shared or dedicated processing device. Such a processing device, can be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the controller 334 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

FIG. 6 is a schematic block diagram of an embodiment of a driver 310' in accordance with the present invention. In particular, driver 310 operates in a similar fashion as driver 310' and includes many similar elements that are referred to by common reference numerals. In this embodiment however, the plurality of inductive elements 300 are implemented by an inductor pair/transformer 300'. Driver 310' detects the touch object 324 in proximity to a selected inductive element 300' based on changes in the mutual inductance of the inductor pair/transformer 300' caused by interruptions in the magnetic field 322' due to the proximity of touch object 324.

For example, measurement circuit 330' and inductor pair/transformer 300' can operate as a magnetometer and react in a consistent fashion to changes in the magnetic field caused by the proximity of touch object 324. In this example, controller 334 can operate measurement circuit 330' without calibration or with minimal calibration of the inductive elements 300'.

FIG. 7 is a schematic block diagram of measurement circuit 330 in accordance with an embodiment of the present invention. In particular a measurement circuit 330 includes a signal generator 340 and sensor circuit 342. Switch matrices 302 and 304 that serve to couple the particular inductive element 300 to the measurement circuit are not specifically shown. Signal generator 346 responds to a control signal 345, e.g. from controller 334, to drive one side of inductive element 300'. In an embodiment of the present invention, signal generator 346 includes an oscillator and sensing circuit 348 includes a resistor and optional amplifier that generates sensing signal 347 as a voltage in response to the current coupled via mutual inductance to the other coil.

In another embodiment, signal generator 346 generates a pulse to drive the selected inductive element 300'. Sensing circuit 348 generates sensing signal 347 in response to the pulse coupled via mutual inductance to the other coil. For example, sensing circuit 348 includes a resistor and optional amplifier that generates a voltage in proportion to the current through the inductive element 300, such as to measure the variation in pulse decay due to the change in self inductance of inductive element 300.

FIG. 8 is a schematic block diagram of measurement circuit 330' in accordance with an embodiment of the present invention. In particular, measurement circuit 330' operates in a similar fashion to measurement circuit 330. In this embodiment however, the plurality of inductive elements 300 are implemented by an inductor pair/transformer 300'. Signal generator 346 responds to a control signal 345, e.g. from controller 334, to drive one side of inductive element 300'. In an embodiment of the present invention, signal generator 340 includes an oscillator and sensing circuit 342 includes a resistor and optional amplifier that generates sensing signal 344 as a voltage in response to the current through the other inductor in the inductor pair 300' or another inductor arranged to form an inductive divider. In another embodiment, signal generator 346 drives the inductive element 300' differentially and/or sensing circuit 348 includes a differential amplifier for using differential mode signaling to detect changes in mutual inductance or to otherwise to generate and detect changes in a magnetic field due to the proximity of a touch object, such as a finger or stylus.

In a further embodiment, signal generator 346 generates a pulse to drive the selected inductive element 300. Sensing circuit 348 generates sensing signal 347 in response to the pulse. For example, sensing circuit 348 includes a resistor and optional amplifier that generates a voltage in proportion to the current through the inductive element 300', such as to measure the variation in pulse decay due to the change in mutual inductance of inductive element 300'.

Figure 9:
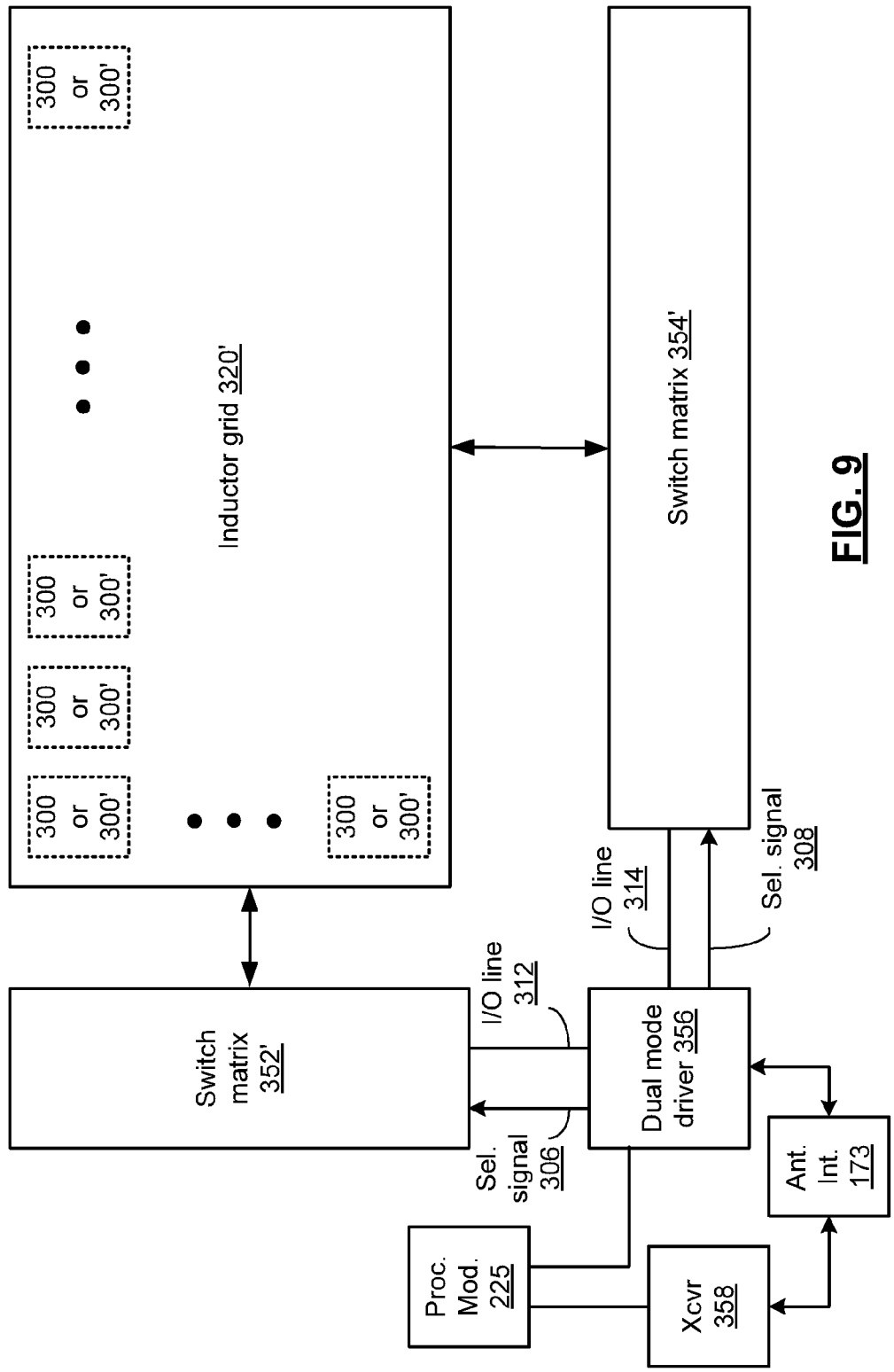
FIG. 9 is a schematic block diagram of another embodiment of inductive touch screen components in accordance with the present invention.

FIG. 9 is a schematic block diagram of another embodiment of inductive touch screen components in accordance with the present invention. Components of an inductive touch screen are shown that include similar elements to those previously discussed that are referred to by common reference numerals. In this embodiment, the touch screen is implemented in a communication device such as communication device 10 that includes a processing module 225 that executes a communication application and a transceiver that communicates radio frequency (RF) signals with at least one remote station in accordance with the communication application. Outbound data generated by the communication application of processing module 225 is sent to the transceiver 358 for transmission to remotes stations via outbound RF signals. Inbound RF signals received by the transceiver 358 are converted to inbound data that are sent to the processing module 225 for use by the communication application.

The touch screen of FIG. 9 operates in a touch screen mode as described in conjunction with FIGS. 1-8. In particular, inductor grid 320', driver 356, and switch matrices 352' and 354', operate in a touch screen mode similarly to inductor grid 320, driver 310, and switch matrices 352 and 354 to generate selection signals 306 and 308 to select an inductive element 300 or 300' from inductor grid 320, to detect a touch object in proximity to the selected inductive element and to generate touch screen data in response thereto, such as touch screen data 316, that is send to processing module 225. In this fashion, such a touch screen can be used in providing a user interface to the communication application of processing module 225 or other applications of the communication device.

However, the touch screen of FIG. 9 is further capable of operating in an antenna mode of operation where a group of inductive elements 300 or 300' of inductor grid 320' are switched by switch matrices 352' and 354' to form an antenna that can be used by transceiver 358 to send and receive RF signals. Optional antenna interface 173 can include a diplexor and/or a transmit/receive switch along with an impedance matching circuit to match the impedance of transceiver 358 to the antenna formed by the group of inductive elements 300 or 300' of inductor grid 320'.

Figure 10:
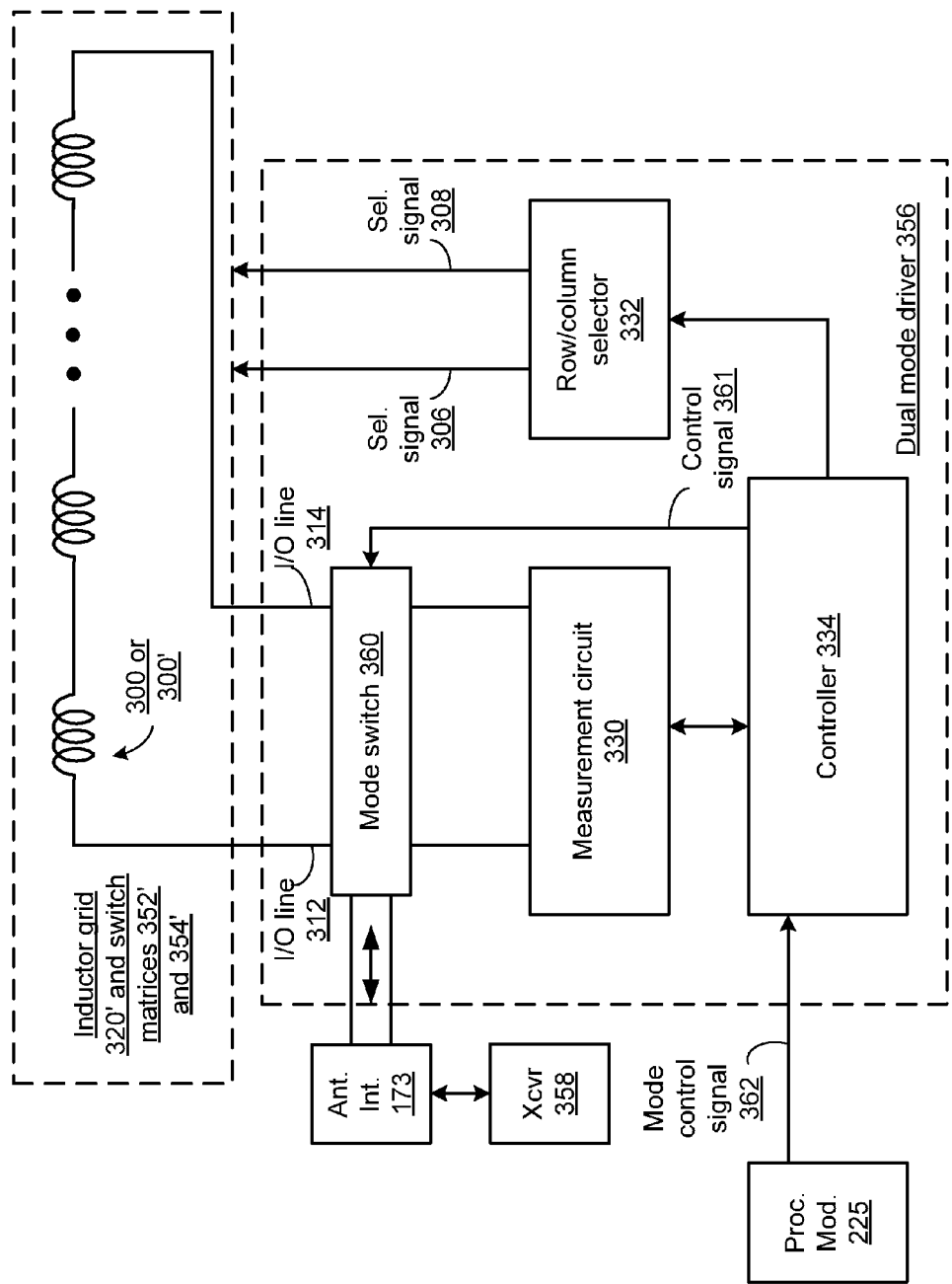
FIG. 10 is a schematic block diagram of dual mode driver 356 in accordance with an embodiment of the present invention.

FIG. 10 is a schematic block diagram of dual mode driver 356 in accordance with an embodiment of the present invention. The dual mode driver 356 includes similar elements to the driver 310 that are referred to by common reference numerals. In this figure, the operation of dual mode driver 356 in an antenna mode of operation is shown. In particular, controller 334 responds to mode control signal 362 from processing module 225 that indicates the antenna mode of operation by commanding row/column selector 332 to generate selection signals 306 and 308 that configure switch matrices 352' and 354' to couple together a group of inductive elements 300 or 300' of inductor grid 320' to form an antenna, such as a near field coil, helix or other antenna. Such a group can include all of the inductive elements of inductor grid 320', a single column or row of the inductor grid 320', or other selected elements. In an embodiment where each of the inductive elements 300' include an inductor pair, switch matrixes 352' and/or 354' can include switches that couple individual inductors in the inductor pair together, in series or in parallel.

Dual mode driver 356 includes mode switch 360 that responds to control signal 361 from controller 334 to couple the antenna formed by the group of inductive elements 300 or 300', via the I/O lines 312 and 314 and antenna interface 173, to transceiver 358. In operation, inbound RF signals received from the antenna formed by the group of inductive elements 300 or 300' are coupled to the transceiver 358 via mode switch 360 and switch matrices 352' and 354'. Similarly, outbound RF signals from the transceiver 358 are coupled to the antenna formed by the group of inductive elements 300 or 300' via mode switch 360 and switch matrices 352' and 354'.

In addition to indicating an antenna mode, mode control signal 362 can optionally indicate a particular antenna mode of a plurality of antenna modes corresponding to different antenna configurations. For instance, these different antenna configurations can correspond to different frequencies or different frequency bands or other configurations that are implemented by different groupings of the inductive elements 300 or 300' of inductor grid 320'. In response to the selection of a particular antenna configuration by mode control signal 362, controller 334 can command row/column selector 332 to generate selection signals 306 and 308 to select the corresponding group of inductive elements 300 or 300' of inductor grid 320'.

Figure 11:
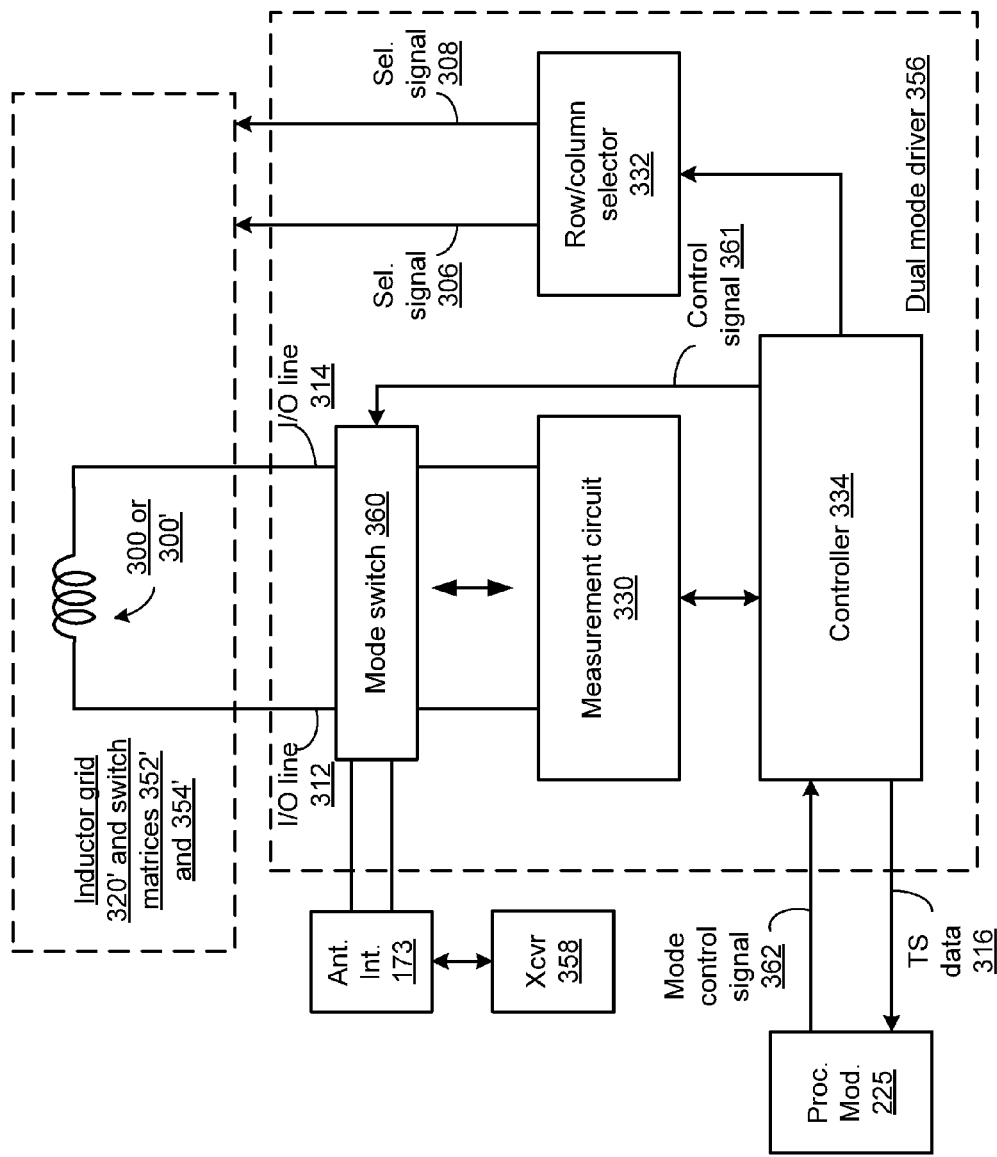
FIG. 11 is a further schematic block diagram of dual mode driver 356 in accordance with an embodiment of the present invention.

FIG. 11 is a further schematic block diagram of dual mode driver 356 in accordance with an embodiment of the present invention. In this figure, the operation of dual mode driver 356 in touch screen mode of operation is shown. In particular, controller 334 responds to mode control signal 362 from processing module 225 that indicates the touch screen mode of operation by commanding row/column selector 332 to generate selection signals 306 and 308 that configure switch matrices 352' and 354' to scan selected inductive elements 300 or 300'. Mode switch 360 responds to control signal 361 from controller 334 to couple the selected inductive elements 300 or 300', via the I/O lines 312 and 314, to measurement circuit for detection of possible touch objects in proximity to the selected inductive elements 300 or 300'. The touch screen data 316 generated by controller 334 in response to this scanning and detection is coupled to processing module 225 for use in conjunction with a communication application or other applications of the communication device.

In operation, processing module 225 can generate mode control signals 362 to alternate between the antenna and touch screen modes. When not transceiving, the transceiver 358 can be disabled to reduce power and the touch screen mode can be selected exclusively. When transceiving, the antenna mode can be selected exclusively for greater throughput. In other cases however, the processing module 225 can multiplex between the antenna and touch screen modes to service both functions for contemporaneous operation of touch screen during communication. In particular, scans of inductive grid 320' can be scheduled during gaps in transmission and reception to maintain the functionality of the touch screen while continuing to communicate with one or more remote stations.

Figure 12:
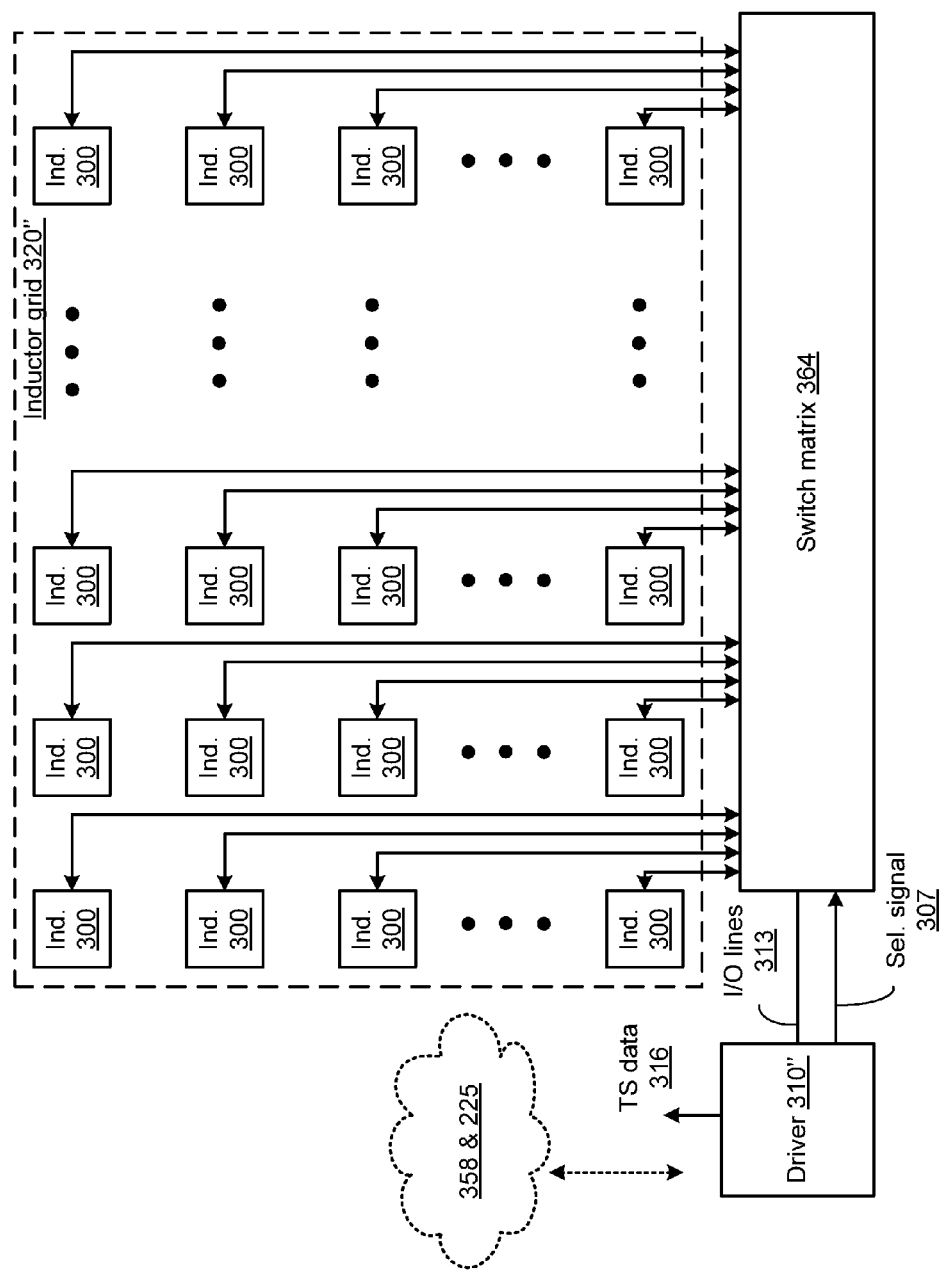
FIG. 12 is a schematic block diagram of another embodiment of inductive touch screen components in accordance with the present invention.

FIG. 12 is a schematic block diagram of another embodiment of inductive touch screen components in accordance with the present invention. In particular, inductor grid 320" can replace inductor grids 320 or 320', switch matrix 364 can replace switch matrices 352/354 or 352'/354' and driver 310" can replace drivers 310, 310' or 356 to operate in a similar fashion to the previously described examples. Unlike the column/row structure of inductor grid 320, in this configuration, each inductive element 300 is individually coupled to switch matrix 364. While inductive elements 300 are shown, inductive elements 300' could be used in a similar fashion.

Switch matrix 364 operates based on selection signal 307 from driver 310" to select individual inductive elements for touch screen operation. Switch matrix 364 optionally can further operate based on selection signal 307 from driver 310" to select one or more different groups of inductive elements 300 or 300' for antenna mode operation in conjunction with transceiver 358 and processing module 225.

Further, inductor grid 320" can operate in a truly simultaneous mode of operation where I/O lines 313 include not only I/O lines 312 and 314 but a separate set of I/O lines. In this fashion, switch matrix 364 can select a group of inductive elements 300 from a portion of the grid such as the top, bottom, side or periphery that that can be coupled to transceiver 358 while using the remaining inductive elements 300 for touch screen operation. In this mode or operation, a communication device, such as communication device 10, can maintain full use of a portion of the touch screen while having uninterrupted usage of the transceiver 358. In particular, when only a portion of the touch screen is active, the entire display surface can be used for display, with available touch portions limited to the portions of the inductor grid 320" that have been reserved for touch screen use.

Figure 13:
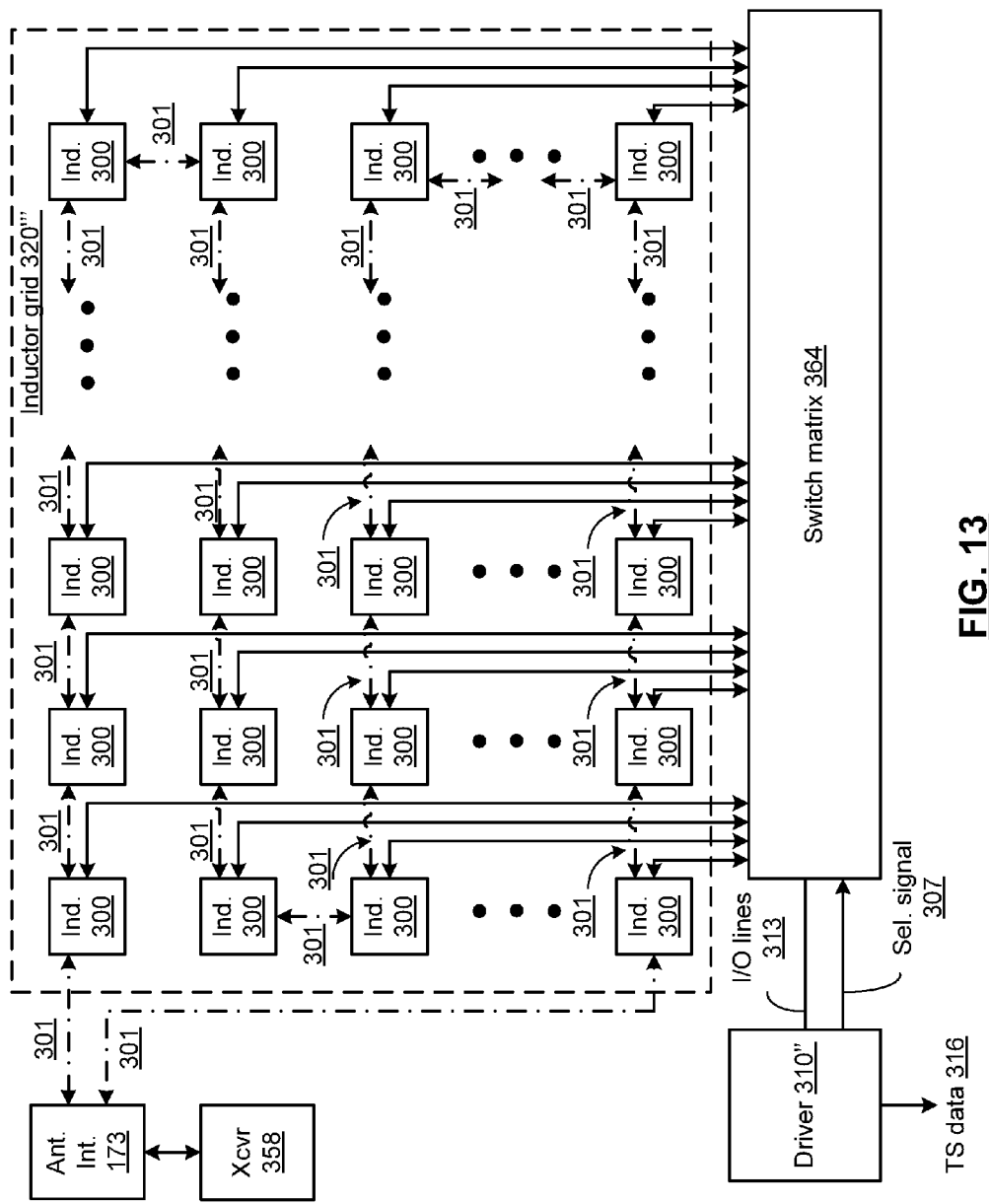
FIG. 13 is a schematic block diagram of another embodiment of inductive touch screen components in accordance with the present invention.

FIG. 13 is a schematic block diagram of another embodiment of inductive touch screen components in accordance with the present invention. In particular, inductor grid 320''' operates in a touch screen mode with switch matrix 364 and 310" as described in conjunction with the example of FIG. 12. In this embodiment however, inductor grid includes a plurality of coupling elements 301 for coupling a group of inductive elements 300 to together to form an antenna, such as a near field coil, helix or other antenna. Such a group can include all of the inductive elements 300 of inductor grid 320' as shown. In other embodiments a single column or row of the inductor grid 320', or other selected elements can be coupled together. In an embodiment where the inductive elements 300 are implemented as inductive elements 300' that include an inductor pair, coupling elements 301 can further couple individual inductors in the inductor pair together, in series or in parallel.

Further, inductor grid 320''' can also operate in a truly simultaneous mode of operation where I/O lines 313 include not only I/O lines 312 and 314 but a separate set of I/O lines. Conductive elements 301 can couple a group of inductive elements 300 from a portion of the grid such as the top, bottom, side or periphery that that can be coupled to transceiver 358 while using the remaining inductive elements 300 for touch screen operation. In this mode or operation, a communication device, such as communication device 10, can maintain full use of a portion of the touch screen while having uninterrupted usage of the transceiver 358. In a further embodiment, filtering in driver 310 and antenna interface 173 can eliminate or reduce bleed-through from the antenna mode and the touch screen mode and vice versa to allow simultaneous use of the fill inductor grid 320''' for both purposes.

Figure 14:
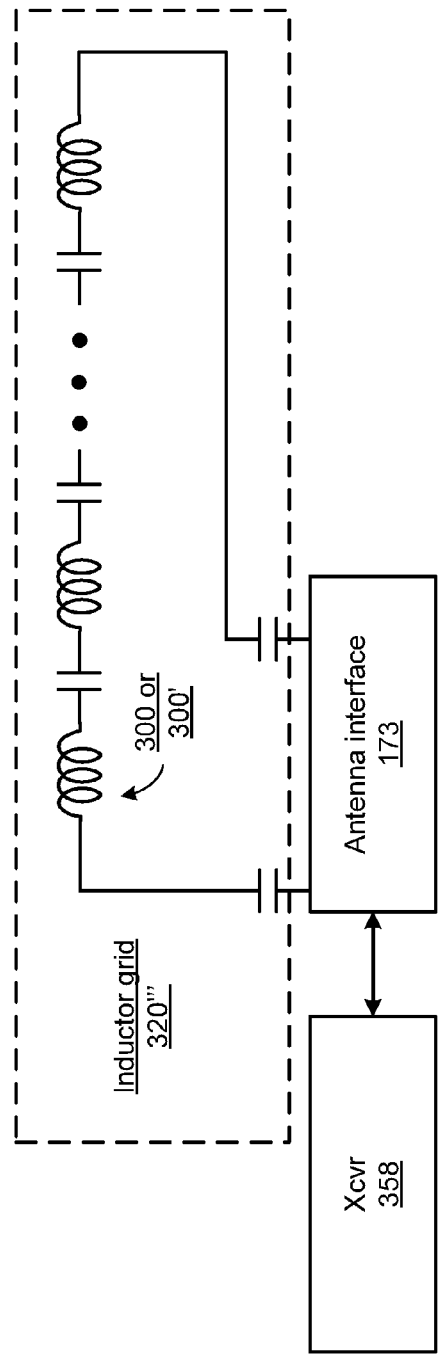
FIG. 14 is a schematic block diagram of inductor grid 320" in accordance with an embodiment of the present invention.

FIG. 14 is a schematic block diagram of inductor grid 320" in accordance with an embodiment of the present invention. In particular, the coupling elements 301 included in the inductor grid 320 and the coupling elements 301 that couple the inductor grid to optional antenna interface 173 are implemented via capacitors that provide a virtual short circuit or other low impedance at the frequency band of transceiver 358 while providing a virtual open circuit or other high impedance at the oscillation frequency, pulse frequency or the pulse frequency components used by driver 310" to drive the inductive elements 300.

While two capacitors are shown to couple the inductor grid 320" to the antenna interface 173, a single capacitor can be employed and/or included in the antenna interface 173.

Figure 15:
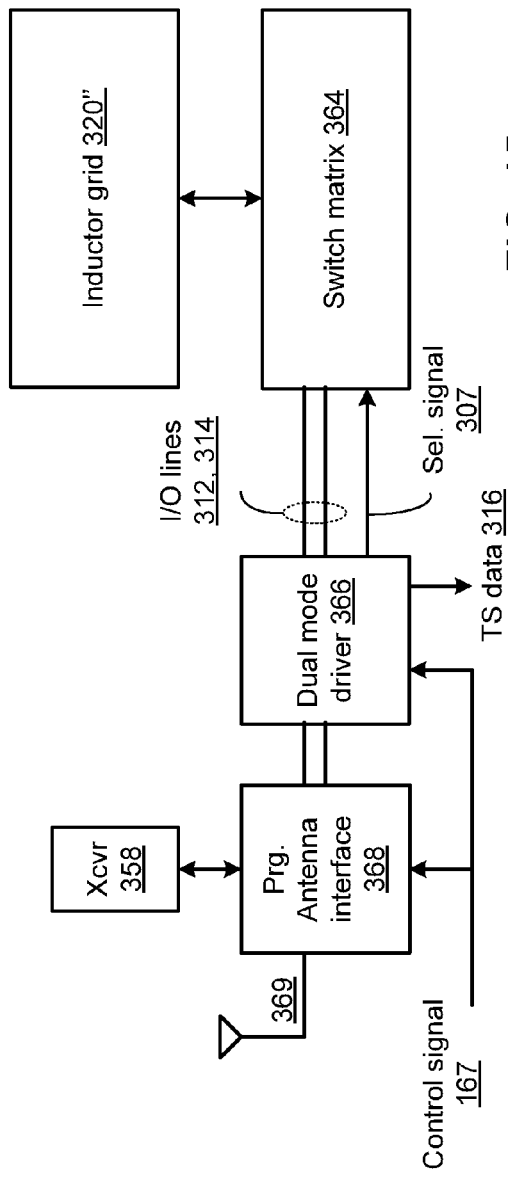
FIG. 15 is a schematic block diagram of a transceiver 358 and programmable antenna interface 368 in accordance with an embodiment of the present invention.

FIG. 15 is a schematic block diagram of a transceiver 358 and programmable antenna interface 368 in accordance with an embodiment of the present invention. This embodiment operates in a similar fashion to the embodiments of 9-12, except that an external antenna 369 is coupled to transceiver 358 via a programmable antenna interface 368. Programmable antenna interface 368 includes a tunable impedance matching circuit that operates via an inductor implemented by a group of inductive elements 300 or 300'.

In operation, control signal 167 indicates a transceiver mode of operation. Dual mode driver 366 operates in response to control signal 167 to generate a selection signal 307 to select a group of the inductive elements 300 or 301 to operate as an inductor for programmable antenna interface 368 and to couple this inductor via a mode switch to programmable antenna interface 368. In the alternative, switch matrix 364 can be used directly to couple the inductor formed by the selected group of inductive elements 300 or 300' to programmable antenna interface 368.

In a similar fashion to the implementation of FIGS. 9-12, control signal 167 can select a particular group to implement a particular inductance to tune the programmable antenna interface 368 to one of a plurality of frequencies, frequency bands, antennas, etc. Further, programmable antenna interface 368 can also respond to control signal 167 to configure or tune one or more internal components to one of a plurality of frequencies, frequency bands, antennas, etc.

Figure 16:
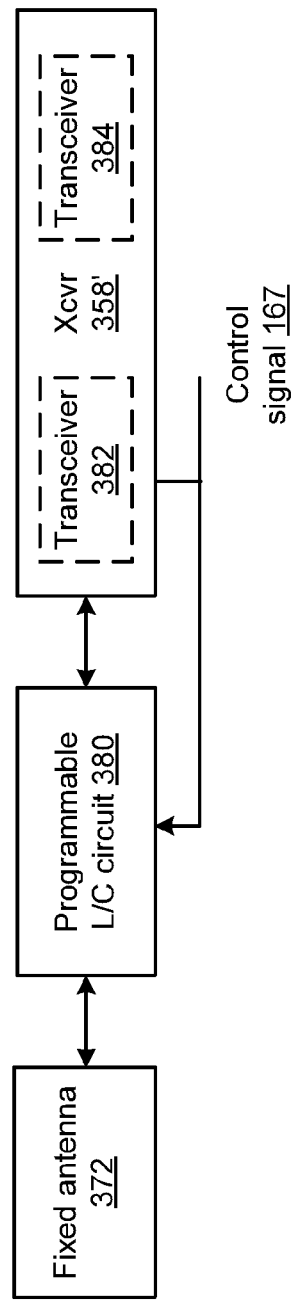
FIG. 16 is a schematic block diagram of a transceiver 358 and programmable antenna interface 368 in accordance with an embodiment of the present invention.

FIG. 16 is a schematic block diagram of a transceiver 358 and programmable antenna interface 368 in accordance with an embodiment of the present invention. In particular, transceiver 358 includes a plurality of transceivers, such as transceivers 382 and 384. Control signal 167 is used by transceiver 358 to select a particular transceiver for use. For example, transceiver 358 can include separate transceivers for operating in the 900 MHz frequency band, and the 2.4 GHz/5.2 GHz frequency bands. The choice of transceiver and the choice of frequency band is indicated via control signal 167 generated by a communication application of a processing module such as processing module 225. Programmable antenna interface 173 and the inductor implemented via the selected group of inductive elements 300 or 300' form a programmable L/C circuit 380 that responds to control signal 167 to provide impedance matching to the antenna 372 at the selected frequency and/or frequency band.

Figure 17:
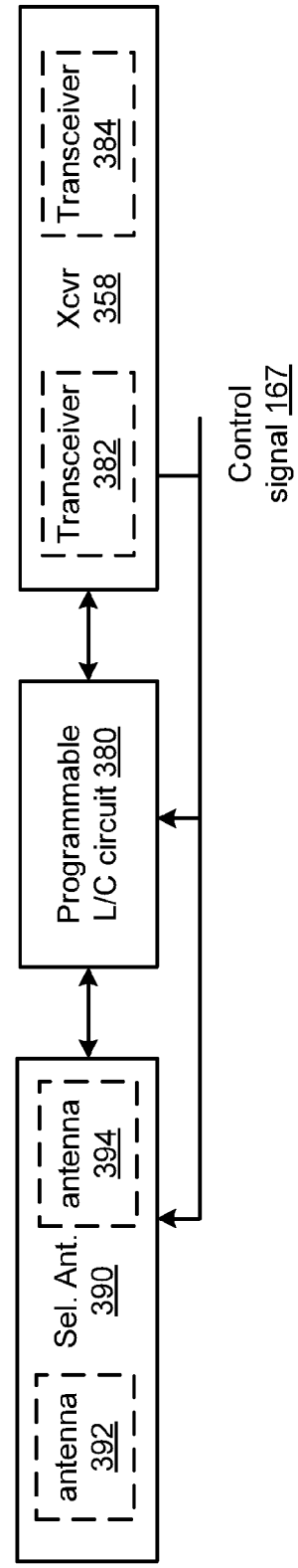
FIG. 17 is a schematic block diagram of a transceiver 358 and programmable antenna interface 368 in accordance with another embodiment of the present invention.

FIG. 17 is a schematic block diagram of a transceiver 358 and programmable antenna interface 368 in accordance with another embodiment of the present invention. In particular, this embodiment operates in a similar fashion to the embodiment of FIG. 16, however, control signal 167 further selects one of a plurality of antennas 392, 394 or otherwise selects an antenna configuration of selectable antenna 390. In this fashion, programmable L/C circuit 380 is controllable based on control signal 167 to match the transceiver 358 to the antenna 390, based on the antenna configuration, frequency band and/or frequency.

Figure 18:
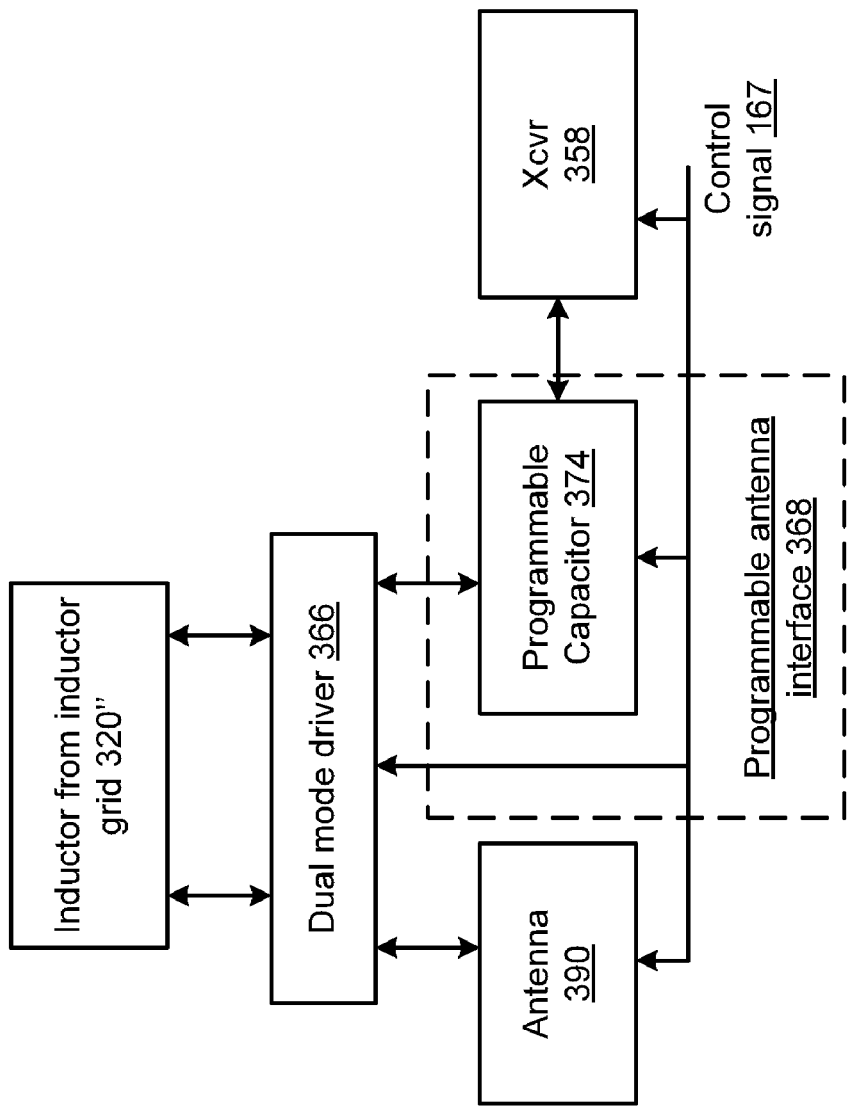
FIG. 18 is a schematic block diagram of programmable antenna interface 368 in accordance with an embodiment of the present invention.

FIG. 18 is a schematic block diagram of programmable antenna interface 368 in accordance with an embodiment of the present invention. In this embodiment, programmable antenna interface 368 operates in conjunction with an inductor formed by the selected group of inductive elements from inductor grid 320" to form programmable L/C circuit 380.

Programmable antenna interface 368 includes a programmable capacitor 374 that includes, for instance, a plurality of fixed capacitors that can be coupled together by an internal switch matrix to generate one or more capacitors of controllable capacitance.

Programmable antenna interface 368 forms a matching circuit with the inductor formed by the selected group of inductive elements from inductor grid 320". This group inductance and the programmable capacitor are controllable based on control signal 167 to match the transceiver 358 to the antenna 390, based on the antenna configuration, frequency band and/or frequency.

Figure 19:
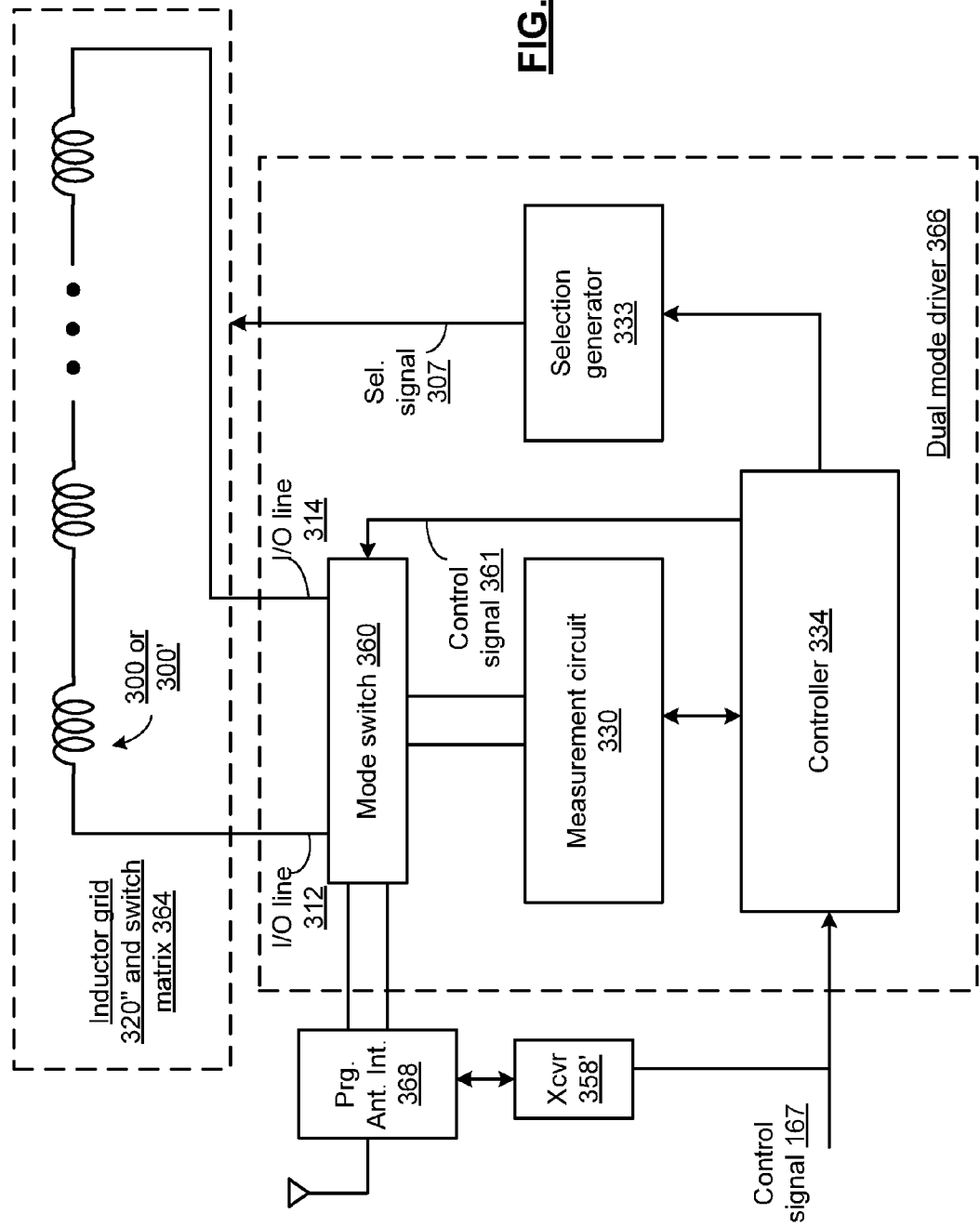
FIG. 19 is a schematic block diagram of dual mode driver 366 in accordance with an embodiment of the present invention.

FIG. 19 is a schematic block diagram of dual mode driver 366 in accordance with an embodiment of the present invention. The dual mode driver 366 includes similar elements to the drivers 310 and 356 that are referred to by common reference numerals. In this figure, the operation of dual mode driver 366 in a transceiver mode of operation is shown. In particular, controller 334 responds to mode control signal 167 from processing module 225 that indicates a transceiver mode of operation by commanding a selection generator selector 333 to generate selection signals 307 to configure switch matrix 364 to couple together a group of inductive elements 300 or 300' of inductor grid 320" to form an inductor. Such a group can include all of the inductive elements of inductor grid 320", a single column or row of the inductor grid 320", or other selected elements and can include a programmable inductance. In an embodiment where each of the inductive elements 300' include an inductor pair, switch matrix 364 can include switches that couple individual inductors in the inductor pair together, in series or in parallel.

Dual mode driver 366 includes mode switch 360 that responds to control signal 361 from controller 334 to couple the inductor formed by the group of inductive elements 300 or 300', via the I/O lines 312 and 314 to programmable antenna interface 368. In operation, this inductance and the programmable antenna interface 368 form a matching network for the antenna and the transceiver 358.

In addition to indicating a transceiver mode, mode control signal 167 can optionally indicate a frequency band, frequency, or a particular antenna mode of a plurality of antenna modes corresponding to different antenna configurations. For instance, these different antenna configurations can correspond to different frequencies or different frequency bands, beam patterns or other antenna configurations. In response to the mode control signal 167, controller 334 can command selection generator 333 to generate selection signal 307 to select the corresponding group of inductive elements 300 or 300' of inductor grid 320'.

Figure 20:
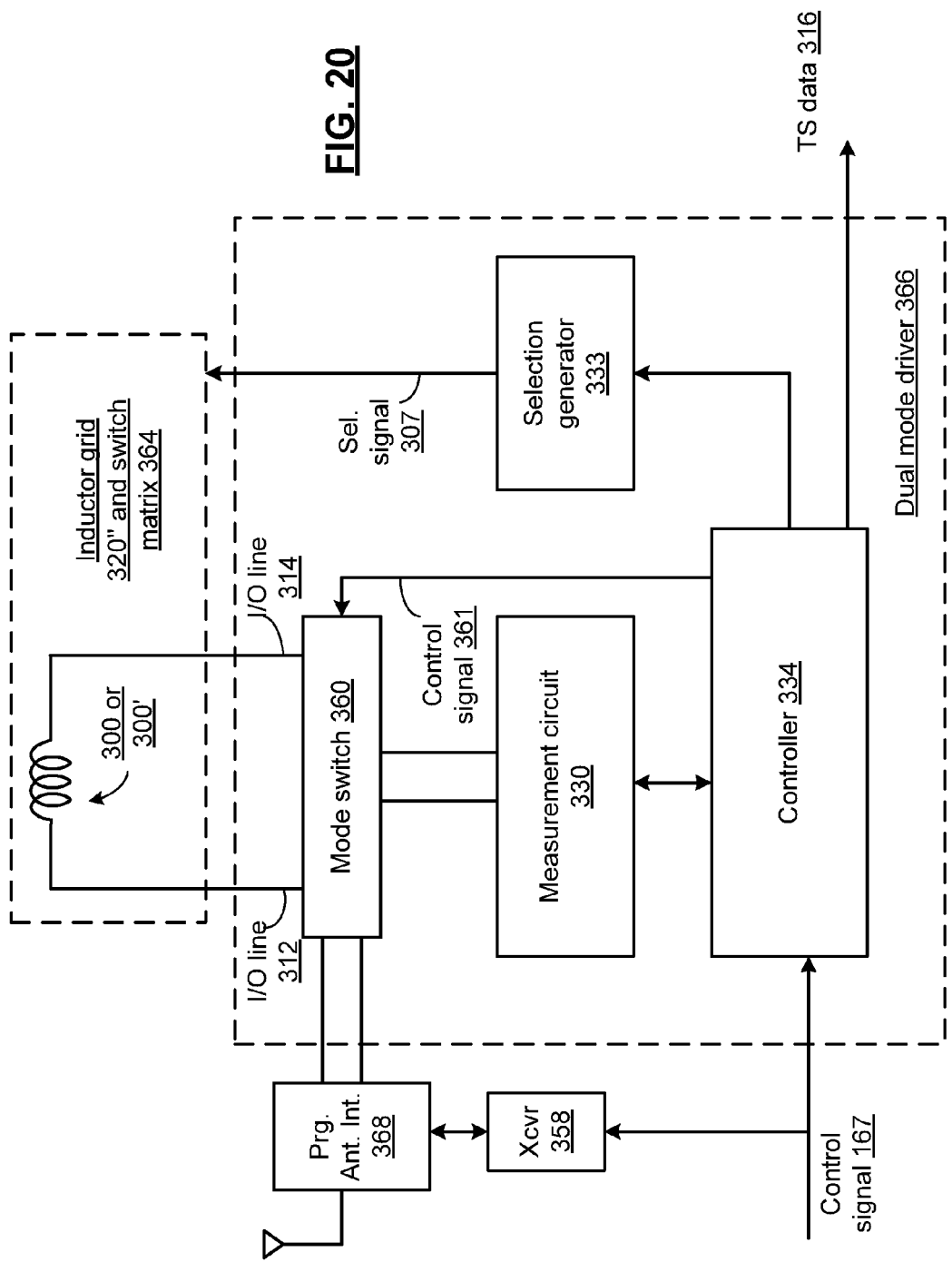
FIG. 20 is a schematic block diagram of dual mode driver 366 in accordance with an embodiment of the present invention.

FIG. 20 is a further schematic block diagram of dual mode driver 366 in accordance with an embodiment of the present invention. In this figure, the operation of dual mode driver 366 in touch screen mode of operation is shown. In particular, controller 333 responds to mode control signal 167 from processing module 225 that indicates the touch screen mode of operation by commanding selection generator 333 to generate selection signal 307 that configure switch matrix 364 to scan selected inductive elements 300 or 300'. Mode switch 360 responds to control signal 361 from controller 334 to couple the selected inductive elements 300 or 300', via the I/O lines 312 and 314, to measurement circuit 330 for detection of possible touch objects in proximity to the selected inductive elements 300 or 300'. The touch screen data 316 generated by controller 334 in response to this scanning and detection is coupled to processing module 225 for use in conjunction with a communication application or other applications of the communication device.

In operation, processing module 225 can generate mode control signals 167 to alternate between the transceiver and touch screen modes. When not transceiving, the transceiver 358 can be disabled to reduce power and the touch screen mode can be selected exclusively. When transceiving, the transceiver mode can be selected exclusively for greater throughput. In other cases however, the processing module 225 can multiplex between the transceiver and touch screen modes to service both functions for contemporaneous operation of touch screen during communication. In particular, scans of inductive grid 320' can be scheduled during gaps in transmission and reception to maintain the functionality of the touch screen while continuing to communicate with one or more remote stations. Further, with modifications to mode switch 360 and/or switch matrix 364, the touch screen can operate in both modes simultaneously with some inductive elements of inductor grid 320" operating as an inductor for programmable antenna interface 368 and other inductive elements of inductor grid 320" operating in conjunction with the touch screen, limiting the portion of the touch screen available for touch interactivity, but not limiting the availability of the entire touch screen for display purposes.

Figure 21:
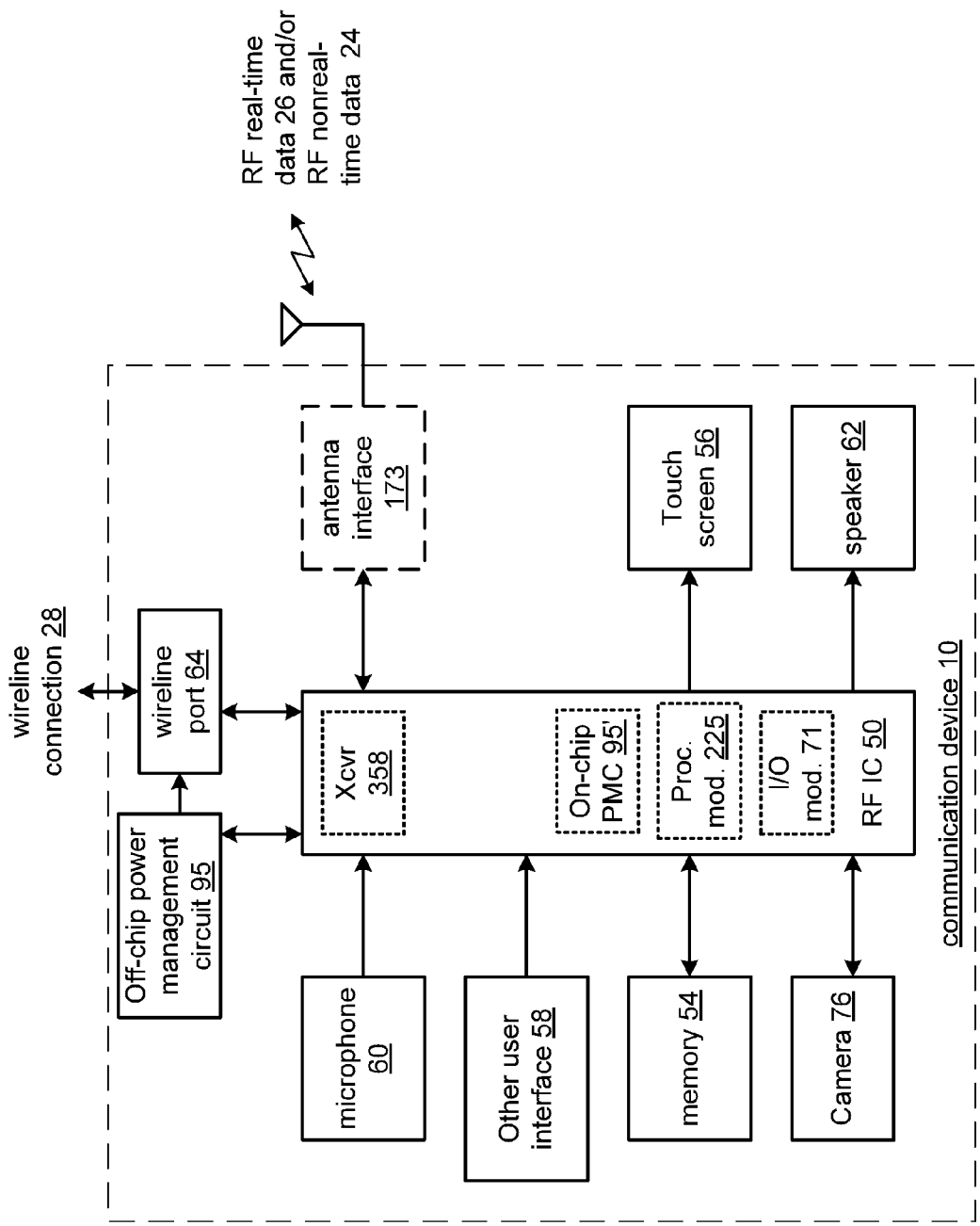
FIG. 21 is a schematic block diagram of communication device 10 in accordance with an embodiment of the present invention.

FIG. 21 is a schematic block diagram of an embodiment of a circuit in accordance with the present invention. In particular, an RF integrated circuit (IC) 50 is shown that implements communication device 10 in conjunction with microphone 60, touch screen 56 such as touch screen 8 described in conjunction with FIGS. 1-14, memory 54, speaker 62, camera 76, and other user interface devices 58, antenna interface 173 and wireline port 64. In addition, RF IC 50 includes a transceiver 358 with RF and baseband modules for formatting and modulating data into RF real-time data 26 and non-real-time data 24 and transmitting this data via the antenna interface 173 and further via an antenna such as a standard antenna, an antenna implemented via touch screen 56 or any of the antennas discussed in conjunction with FIGS. 25-30.

Further, RF IC 50 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a touch screen interface for generating data from touch screen 56 in response to the actions of a user, a display driver for driving the display of touch screen 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the RF IC 50 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the RF IC 50. RF IC 50 optionally includes an on-chip power management circuit 95' for replacing the off-chip power management circuit 95.

In an embodiment of the present invention, the RF IC 50 is a system on a chip integrated circuit that includes a processing module 225 for executing a communication application for communicating with one or more remote stations via transceiver 358 and optionally one or more additional applications of communications device 10. Such a processing device, for instance, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the processing module 225 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

Figure 22:
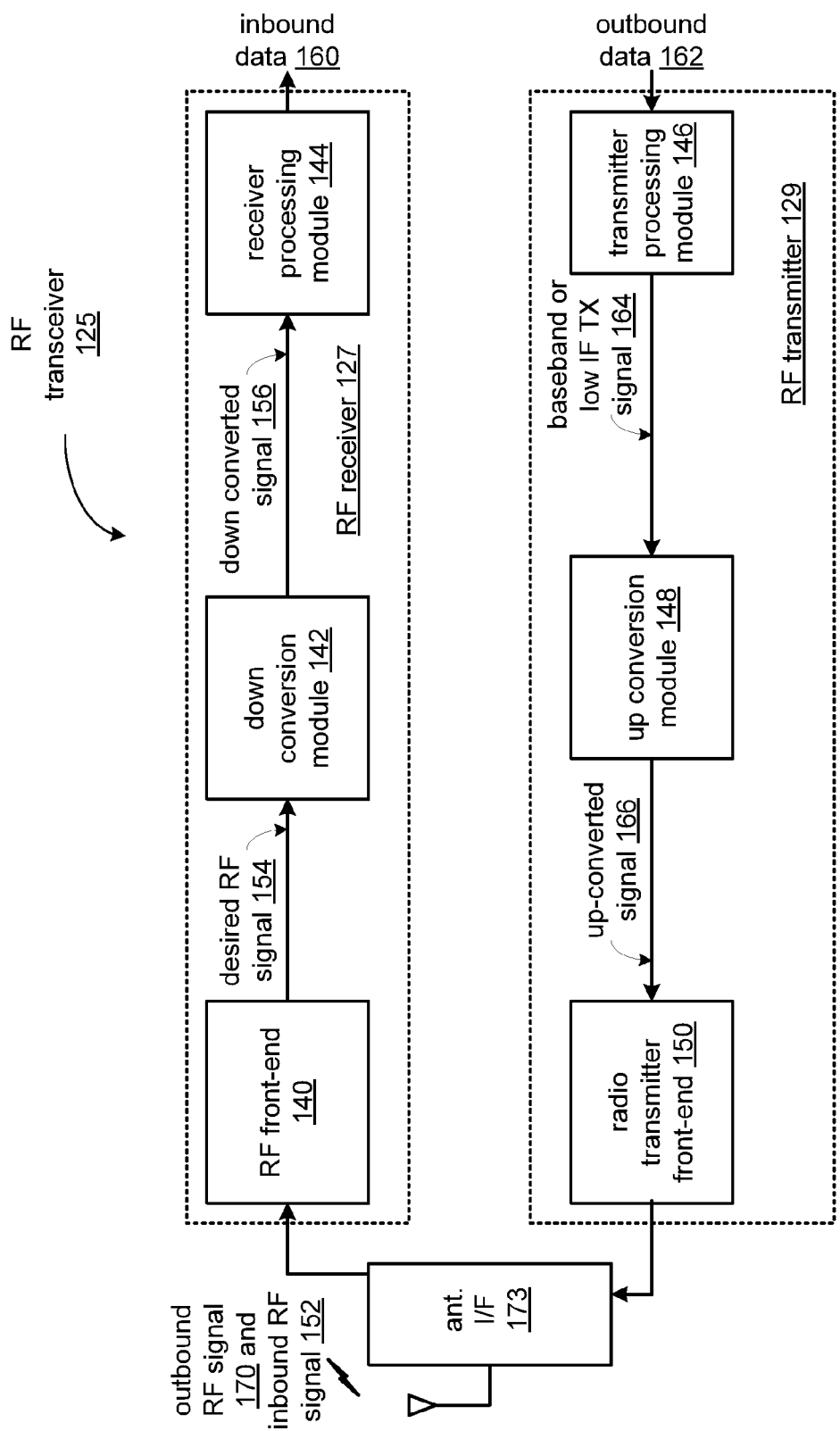
FIG. 22 is a schematic block diagram of RF transceiver 125 in accordance with an embodiment of the present invention.

FIG. 22 is a schematic block diagram of an RF transceiver 125 in accordance an embodiment of the present invention. The RF transceiver 125, such as transceiver 358, includes an RF transmitter 129, and an RF receiver 127. The RF receiver 127 includes a RF front end 140, a down conversion module 142 and a receiver baseband processing module 144. The RF transmitter 129 includes a transmitter baseband processing module 146, an up conversion module 148, and a radio transmitter front-end 150.

As shown, the receiver and transmitter are each coupled to an antenna through an antenna interface 173 that couples the transmit signal 155 to the antenna to produce outbound RF signal 170 and couples inbound signal 152 to produce received signal 153. While a single antenna is represented, the receiver and transmitter may share a multiple antenna structure that includes two or more antennas. In another embodiment, the receiver and transmitter may share a multiple input multiple output (MIMO) antenna structure, diversity antenna structure, phased array or other controllable antenna structure that includes a plurality of antennas. Each of these antennas may be fixed, programmable, and antenna array or other antenna configuration.

In operation, the transmitter receives outbound data 162 from other portions of its a host device, such as a communication application executed by processing module 225 or other source via the transmitter processing module 146. The transmitter processing module 146 processes the outbound data 162 in accordance with a particular wireless communication standard to produce baseband or low intermediate frequency (IF) transmit (TX) signals 164 that contain outbound data 162. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 can include, but is not limited to, scrambling, encoding, puncturing, mapping, modulation, and/or digital baseband to IF conversion.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up-converted signals 166 based on a transmitter local oscillation.

The radio transmitter front end 150 includes a power amplifier and may also include a transmit filter module. The power amplifier amplifies the up-converted signals 166 to produce outbound RF signals 170, which may be filtered by the transmitter filter module, if included. The antenna structure transmits the outbound RF signals 170 to a targeted device such as a RF tag, base station, an access point and/or another wireless communication device via antenna interface 173 coupled to an antenna that provides impedance matching and optional bandpass filtration.

The receiver receives inbound RF signals 152 via the antenna and antenna interface 173 that operate to process the inbound RF signal 152 into received signal 153 for the receiver front-end 140. the receiver front-end 140 can include a low noise amplifier and optional filtration. The down conversion module 142 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a wireless communication protocol to produce inbound data 160. The processing performed by the receiver processing module 144 includes, but is not limited to, digital intermediate frequency to baseband conversion, demodulation, demapping, depuncturing, decoding, and/or descrambling.

Figure 23:
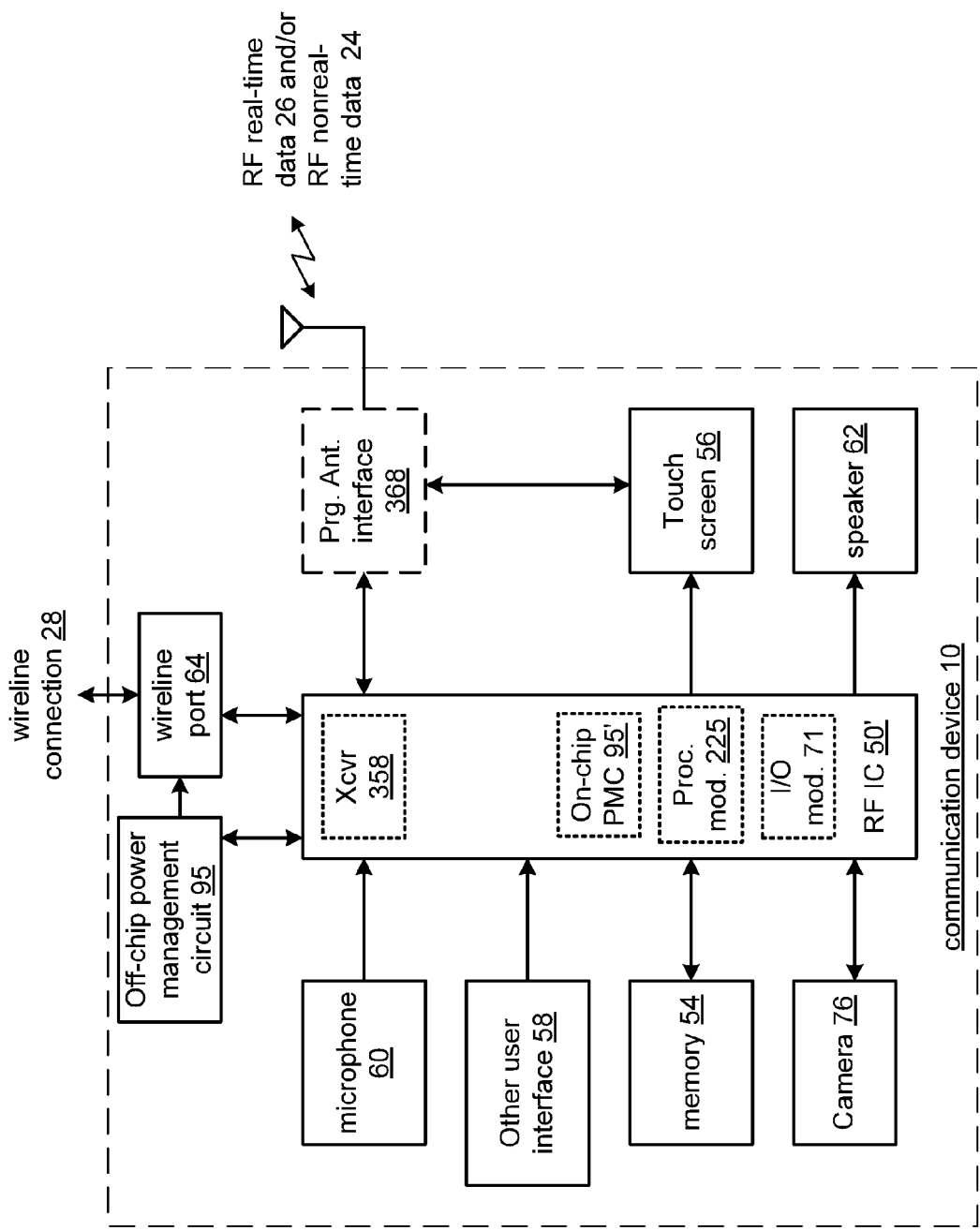
FIG. 23 is a schematic block diagram of communication device 10 in accordance with an embodiment of the present invention.

FIG. 23 is a schematic block diagram of an embodiment of a circuit in accordance with the present invention. In particular, an RF integrated circuit (IC) 50' is shown that implements communication device 10 in conjunction with microphone 60, touch screen 56 such as touch screen 8 described in conjunction with FIGS. 14-20, along with programmable antenna interface 368. The RF IC 50, operates in a similar function to RF IC 50 and includes many similar elements that are referred to by common reference numerals.

Figure 24:
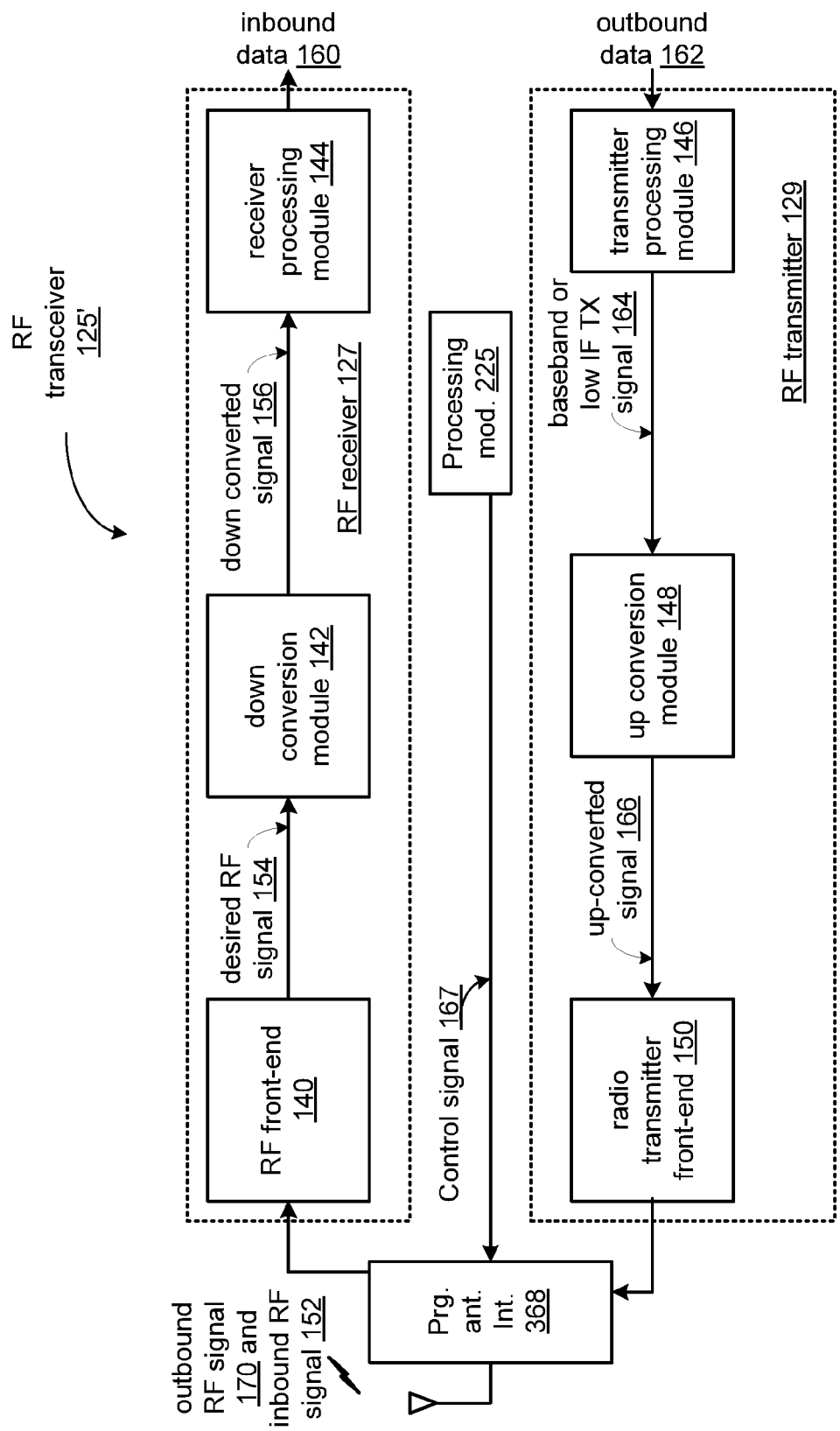
FIG. 24 is a schematic block diagram of RF transceiver 125' in accordance with an embodiment of the present invention.

FIG. 24 is a schematic block diagram of an RF transceiver 125 in accordance an embodiment of the present invention. The RF transceiver 125', such as transceiver 358, includes an RF transmitter 129, and an RF receiver 127. RF transceiver 125' operates in a similar function to RF transceiver 125 and includes many similar elements that are referred to by common reference numerals. However, programmable interface is configurable based on control signal 167 from processing module 225 as previously described.

Figure 25:
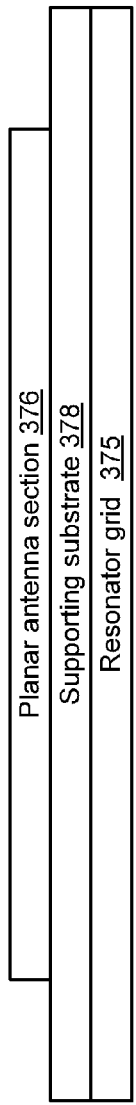
FIG. 25 is a side view of an embodiment of antenna components in accordance with the present invention.

FIG. 25 is a side view of an embodiment of antenna components in accordance with the present invention. In particular, an antenna is presented for use in conjunction with a communication device, such as communication device 10 or other wireless device having at least one transceiver that communicates RF signals with at least one remote station. The antenna includes a planar antenna section 376, a resonator grid 375 and a supporting substrate. The planar antenna section 376 can include one or more conductive elements in any of a wide variety of planar patterns for a single antenna, a multi-antenna array, such as a phased array antenna, multiinput multi-output (MIMO) antenna or other antenna configuration that sends and receives signals from one or more remote stations at RF frequencies.

The antenna can be implemented in a device such as a die, integrated circuit package, printed circuit (PC) board or other configuration. In the embodiment shown, the planar antenna section 376 is implemented on a first layer of the device, and the resonator grid 375 is implemented on a second layer of a device, and wherein the first layer and the second layer are in parallel. In the configuration shown, the resonator grid 375 and planar antenna section 376 are separated and supported by a supporting substrate 378, such as a thin film, PC board, glass substrate or other supporting member, however, other configurations are possible where the area between planar antenna section 376 and resonator grid 375 are separate by an air gap or other materials and other supporting members are included. It should be noted that the side view shown is for illustrative purposes only and the elements are not drawn to scale. In particular, the spacing between the resonator grid 375 and the planar antenna section 376 is dependent on the thickness of optional supporting substrate 378 and its composition, and the operating frequency of the antenna.

The resonator grid 375 includes a plurality of resonators, such as microstrip resonators or other bandgap resonators that are arranged in a planar array to electromagnetically enhance the performance of antenna. In particular, the resonators of resonator grid 375 can be configured and sized to resonate at an operating frequency of the planar antenna 376. In operation, the resonator grid 375 can enhance the magnetic coupling of the antenna to increase antenna performance. The planar antenna section 376 can be arranged to have has a greater surface area that the surface area of the resonator grid 375 to accentuate this feature.

Figure 26:
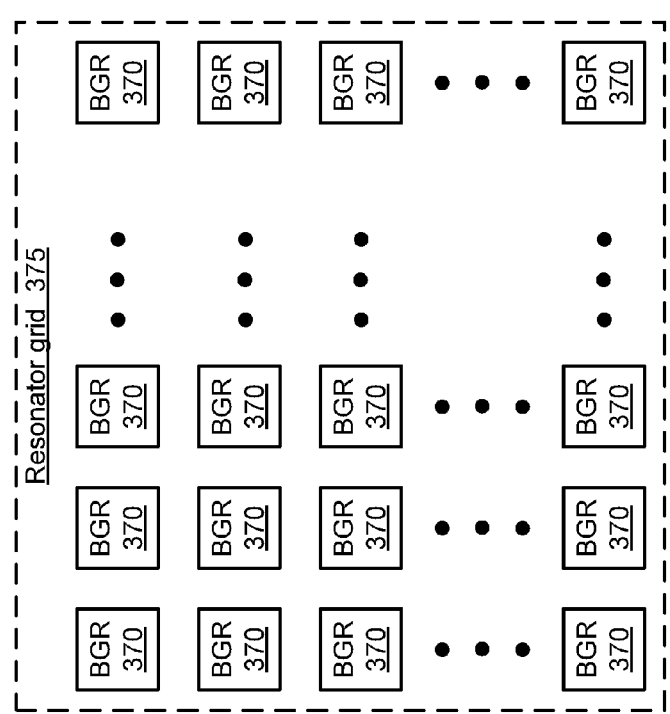
FIG. 26 is a schematic block diagram of resonator grid 375 in accordance with an embodiment of the present invention.

FIG. 26 is a schematic block diagram of resonator grid 375 in accordance with an embodiment of the present invention. In this configuration, the resonator grid 375 includes a plurality of bandgap resonators 370 that are arranged in an array on the grid. As discussed in conjunction with FIG. 25, each of the bandgap resonators 370 can be microstrip resonators or other bandgap resonators that are arranged in a planar array. In particular, the resonators of resonator grid 375 can be configured and sized to resonate at an operating frequency of the planar antenna 376.

FIG. 27 is a pictorial diagram of a portable device having an inductive touch screen in accordance with the present invention. In particular, planar antenna section 376 can be implemented via one of the antenna configurations previously discussed in conjunction with a portable device 8, such as communication device 10, and further with the inclusion of resonator grid 375. In particular, an antenna formed in conjunction with an inductor grid of inductive touch screen 8 can be used in the implementation of planar antenna section 376. In the alternative, a thin film antenna or other planar antenna section can be utilized in the implementation of the portable device 6 in such a design.

FIG. 28 is a side view of an embodiment of antenna components in accordance with the present invention. In this configuration, the resonator grid 375 is supported by housing 379 of a device, such as portable device 6. As shown, the antenna section 376 is implemented via an inductive grid of inductive touch screen or via another planar antenna configuration on a thin film, PC board, glass substrate or other supporting member. The antenna section 376 is spaced apart from by spacing elements 374, and in is parallel with the resonator grid 375.

It should be noted that the side view shown is for illustrative purposes only and the elements are not drawn to scale. Further, other components of the portable device 6 are not specifically shown. The spacing elements 374 are indicated as blocks but can be implemented as PC board supports, integrated circuit elements or other supports depending on the implementation of the antenna and the dimensions required.

FIG. 29 is a top view of an embodiment of a portion of a resonator grid in accordance with the present invention. In particular, a microstrip resonator is shown that forms one of the band gap resonators 370 of resonator grid 375. The microstrip resonator includes conductors 380 and 382, such as metal traces, a metal foil or other conductive elements that are supported by a supporting substrate 378. Conductors 380 and 382 have dimensions and gap width that are sized to resonate at a frequency in the operating frequency range of the antenna formed by planar antenna section 376. While not shown, one or both of the conductors can be grounded at one end via an electrical connection. It should be noted that the top view shown is for illustrative purposes only and the elements are not drawn to scale.

Figure 30:
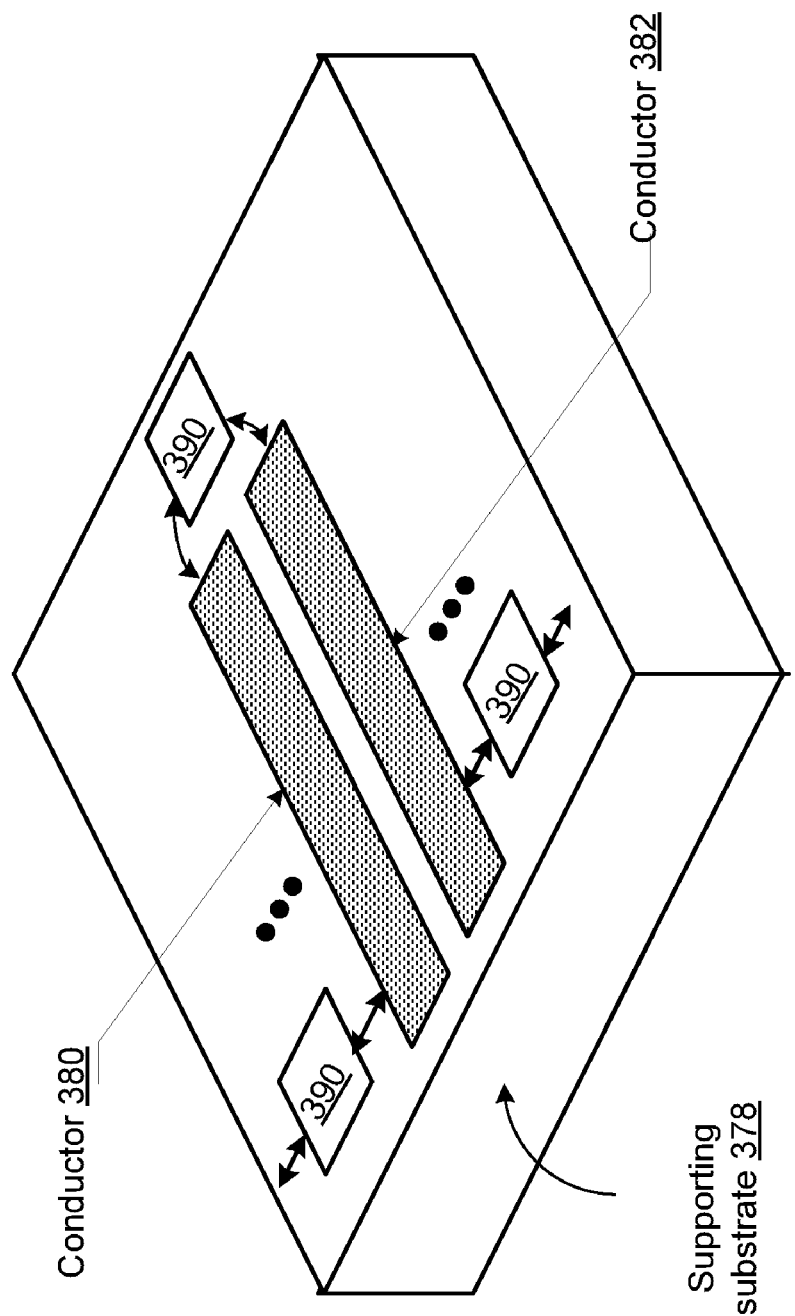
FIG. 30 is a top view of another embodiment of a portion of a resonator grid in accordance with the present invention.

FIG. 30 is a top view of another embodiment of a portion of a resonator grid in accordance with the present invention. In particular a microstrip resonator is shown that includes similar elements to the microstrip resonator of FIG. 29 that are referred to by common reference numerals. In addition conductors 380 and 382 are coupled together and to other microstrips of resonator grid 375 by a plurality of coupling elements 390 to form a ground plane during certain modes of operation. In an embodiment of the present invention, the coupling elements include a plurality of switches in a switch matrix that is controlled in conjunction with a control signal to couple the conductors 380 and 382 of selected microstrips of resonator grid 375 together in a ground plane mode, and to uncouple the microstrips during a normal mode of operation.

In a further mode of operation, the plurality of coupling elements 390 are implemented via a plurality of inductors that provide a high impedance at the operating frequency of the antenna and a low impedance for operation as a ground plane. In an embodiment of the present invention, the coupling elements 390 can be implemented via inductors 300 or 300' of an inductive touch screen.

Figure 31:
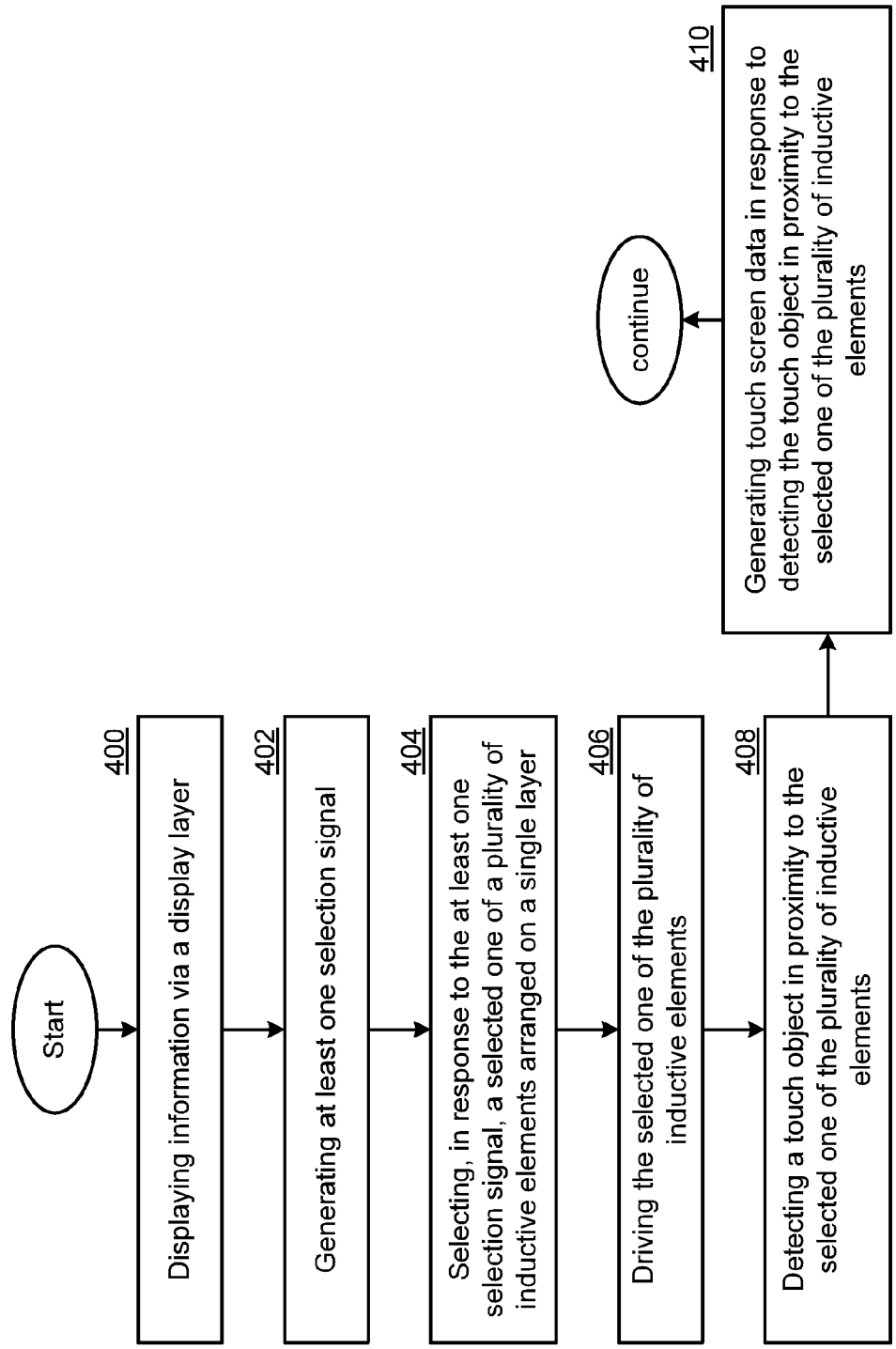
FIG. 31 is a flowchart representation of an embodiment of a method in accordance with the present invention.

FIG. 31 is a flowchart representation of an embodiment of a method in accordance with the present invention. In particular, a method is presented for use in conjunction with one or more features and functions described in conjunction with FIGS. 1-24. In step 400, information is displayed via a display layer. In step 402, at least one selection signal is generated. In step 404, a selected one of a plurality of inductive elements arranged on a single layer is selected in response to the at least one selection signal. In step 406, the selected one of the plurality of inductive elements is driven. In step 408, a touch object is detected in proximity to the selected one of the plurality of inductive elements. In step 410, touch screen data is generated in response to detecting the touch object in proximity to the selected one of the plurality of inductive elements.

In an embodiment of the present invention, the plurality of inductive elements each include a single inductor. Step 406 can include detecting the touch object in proximity to the selected one of the plurality of inductive elements based on a measured self inductance of the single inductor. Step 406 can also include executing a calibration procedure to detect an initial self inductance and step 410 can include generating the touch screen data based on a comparison of the measured self inductance and the initial self inductance. In another embodiment, the plurality of inductive elements each include a inductor pair and step 406 can include detecting the touch object in proximity to the selected one of the plurality of inductive elements based on a mutual inductance of the inductor pair.

The touch screen data can include a grid position associated with the selected one of the plurality of inductive elements. The at least one selection signal can includes a row selection signal and a column selection signal. Step 402 can include generating the row selection signal and the column selection signal to sequentially scan the plurality of inductive elements.

Step 406 can include generating an oscillation to drive the selected one of the plurality of inductive elements and generating a sensing signal in response to the oscillation. Step 406 can include generating a pulse to drive the selected one of the plurality of inductive elements and generating a sensing signal in response to the pulse.

The touch object can include a finger, stylus or other object. Step 410 can include detecting the touch object deflecting the display layer.

Figure 32:
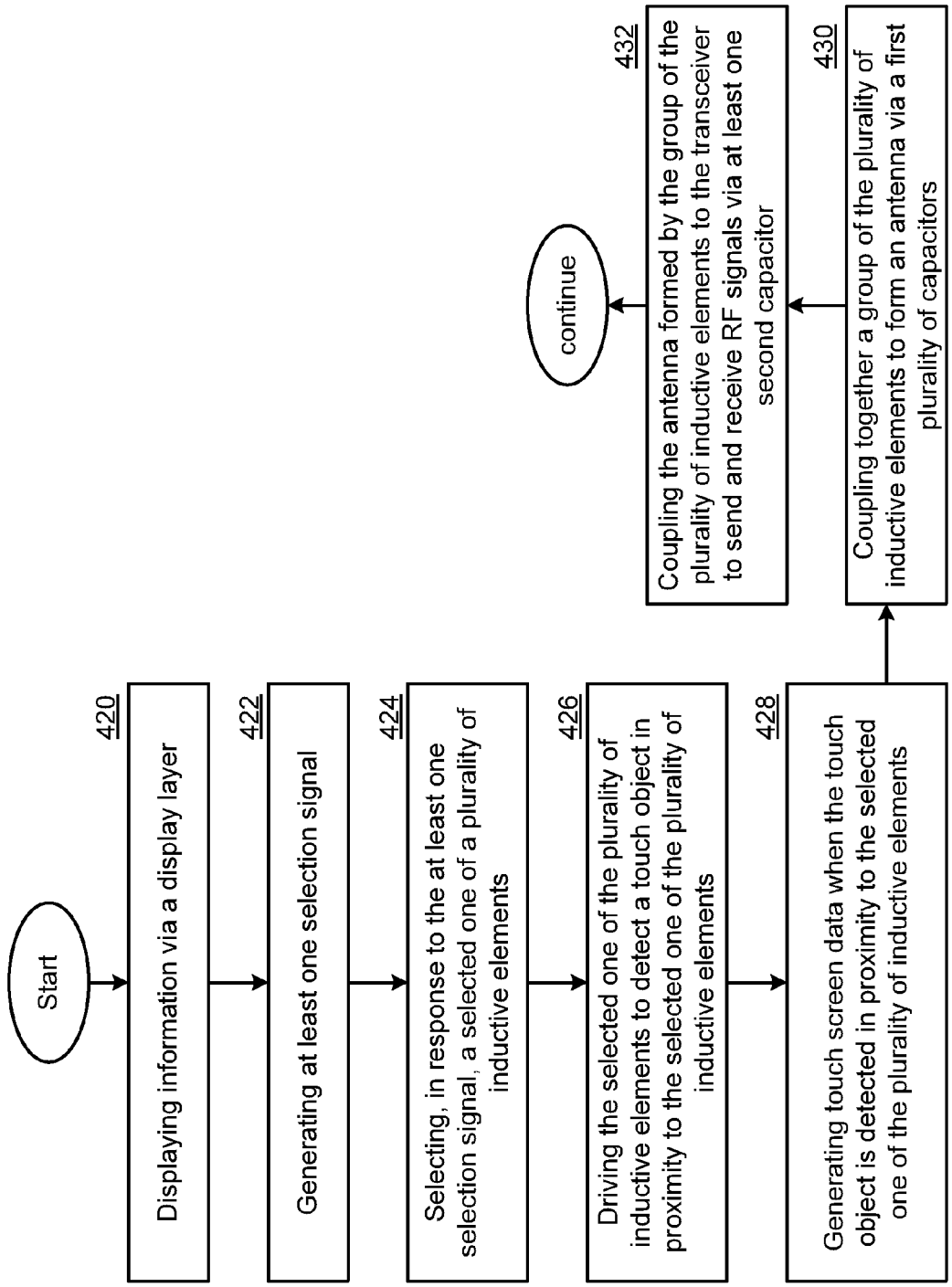
FIG. 32 is a flowchart representation of an embodiment of a method in accordance with the present invention.

FIG. 32 is a flowchart representation of an embodiment of a method in accordance with the present invention. In particular, a method is presented for use in conjunction with one or more features and functions described in conjunction with FIGS. 1-25. In step 420, information is displayed via a display layer. In step 422, at least one selection signal is generated. In step 424, a selected one of a plurality of inductive elements is selected in response to the at least one selection signal. In step 426, the selected one of the plurality of inductive elements is driven to detect a touch object in proximity to the selected one of the plurality of inductive elements. In step 428, touch screen data is generated in response when the touch object is detected in proximity to the selected one of the plurality of inductive elements. In step 430, a group of the plurality of inductive elements are coupled together to form an antenna via a first plurality of capacitors. In step 432, the antenna formed by the group of the plurality of inductive elements is coupled to the transceiver via at least one second capacitors to send and receive the RF signals.

Figure 33:
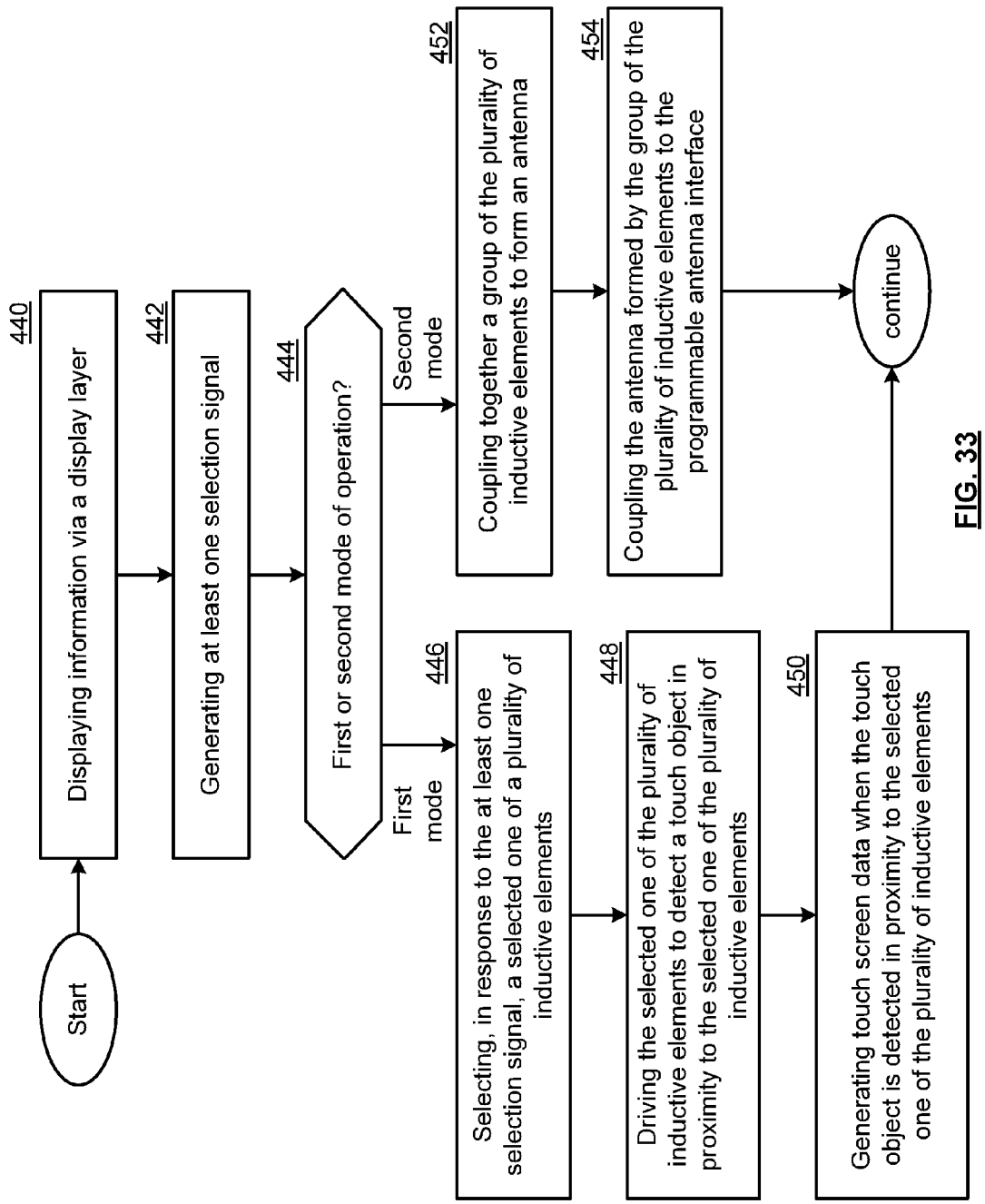
FIG. 33 is a flowchart representation of an embodiment of a method in accordance with the present invention.

FIG. 33 is a flowchart representation of an embodiment of a method in accordance with the present invention. In particular, a method is presented for use in conjunction with one or more features and functions described in conjunction with FIGS. 1-26. In step 440, information is displayed via a display layer. In step 442, at least one selection signal is generated. In decision block 444, the method determines whether a first or second mode of operation is selected. In a first mode of operation the method executes step 446 of selecting, in response to the at least one selection signal, a selected one of a plurality of inductive elements; step 448 of driving the selected one of the plurality of inductive elements to detect a touch object in proximity to the selected one of the plurality of inductive elements; and step 450 of generating touch screen data in response thereto. In a second mode of operation the method executes step 452 of coupling together a group of the plurality of inductive elements; and step 454 of coupling the group of the plurality of inductive elements to the programmable antenna interface.

Figure 34:
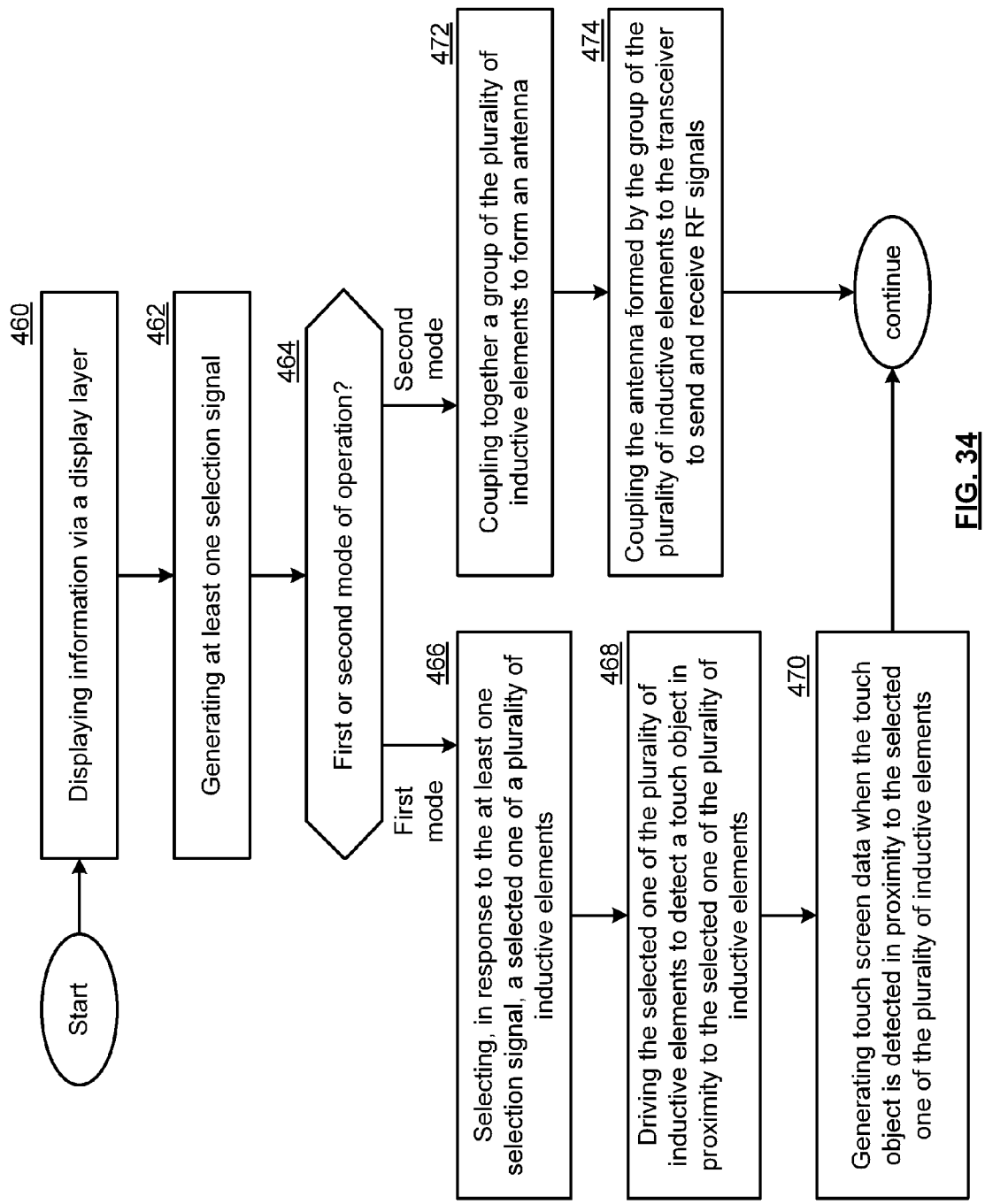
FIG. 34 is a flowchart representation of an embodiment of a method in accordance with the present invention.

FIG. 34 is a flowchart representation of an embodiment of a method in accordance with the present invention. In particular, a method is presented for use in conjunction with one or more features and functions described in conjunction with FIGS. 1-27. In step 460, information is displayed via a display layer. In step 462, at least one selection signal is generated. In decision block 464, the method determines whether a first or second mode of operation is selected. In a first mode of operation the method executes step 466 of selecting, in response to the at least one selection signal, a selected one of a plurality of inductive elements; step 468 of driving the selected one of the plurality of inductive elements to detect a touch object in proximity to the selected one of the plurality of inductive elements; and step 470 of generating touch screen data in response thereto. In a second mode of operation the method executes step 472 of coupling together a group of the plurality of inductive elements to form an antenna; and step 474 of coupling the antenna formed by the group of the plurality of inductive elements to the transceiver to send and receive RF signals.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention has been described in conjunction with various illustrative embodiments that include many optional functions and features. It will be apparent to those skilled in the art that the disclosed invention may be modified in numerous ways, the functions and features of these embodiments can be combined in other embodiments not expressly shown, and may assume many embodiments other than the preferred forms specifically set out and described above. Accordingly, it is intended by the appended claims to cover all modifications of the invention which fall within the true spirit and scope of the invention.

What is claimed is:

1. A communication device comprising:
a processor that executes a communication application;
a transceiver, coupled to the processor, that communicates radio frequency (RF) signals with at least one remote station in accordance with the communication application;
an inductive touch screen, coupled to the processor, that provides a user interface for the communication device, the inductive touch screen having a plurality of inductive elements; and
an antenna, coupled to the transceiver, that includes a plurality of inductors that provide a high impedance at an operating frequency of the antenna, wherein the plurality of inductors form a ground plane from the antenna at low frequencies, and wherein the plurality of inductors are implemented via the plurality of inductive elements of the inductive touch screen.

2. The communication device of claim 1 wherein the antenna is a planar antenna implemented on a first layer of a device and a resonator grid is implemented on a second layer of a device, and wherein the first layer and the second layer are in parallel.

3. The communication device of claim 2 wherein the device includes one of:
a die;
an integrated circuit package; and
a printed circuit board.

4. The communication device of claim 2 wherein the planar antenna has a first surface area on the first layer and the resonator grid has a second surface area on the second layer, and wherein the first surface area is less than the second surface area.

5. The communication device of claim 2 wherein the resonator grid includes a plurality of microstrip resonators.

6. The communication device of claim 2 wherein the resonator grid resonates at an operating frequency of the planar antenna.

7. The communication device of claim 2 wherein the communication device further comprises:
a housing;
wherein the resonator grid is coupled to the housing.

8. An antenna for use in a communication device, the antenna comprising:
an antenna section that includes a plurality of antenna elements; and
a plurality of inductors that decouple the plurality of antenna elements at an operating frequency of the antenna, wherein the plurality of inductors form a ground plane from the plurality of antenna elements at low frequencies, and wherein the plurality of inductors are implemented via a plurality of inductive elements of an inductive touch screen.

9. The antenna of claim 8 wherein the antenna section is implemented on a first layer of a device and a resonator grid is implemented on a second layer of a device, and wherein the first layer and the second layer are in parallel.

10. The antenna of claim 9 wherein the device includes one of:
a die;
an integrated circuit package; and
a printed circuit board.

11. The antenna of claim 9 wherein the antenna section has a first surface area on the first layer and the resonator grid has a second surface area on the second layer, and wherein the first surface area is less than the second surface area.

12. The antenna of claim 9 wherein the resonator grid includes a plurality of micro strip resonators.

13. The antenna of claim 9 wherein the resonator grid resonate at an operating frequency of the antenna.

14. The antenna of claim 9 wherein the wherein the resonator grid is coupled to a housing of the communication device.

* * * * *

UNITED STATES PATENT AND TRADEMARK OFFICE
CERTIFICATE OF CORRECTION

PATENT NO. : 8,325,153 B2
APPLICATION NO. : 13/269960
DATED : December 4, 2012
INVENTOR(S) : Ahmadreza Rofougaran Page 1 of 1

It is certified that error appears in the above-identified patent and that said Letters Patent is hereby corrected as shown below:

In the Claims

Col. 22, line 43, in claim 14: after "claim 9" delete first occurrence of "wherein the"

Signed and Sealed this
Twenty-ninth Day of October, 2013

Teresa Stanek Rea
*Deputy Director of the United States Patent and Trademark Office*